(12) United States Patent
Masutani et al.

(10) Patent No.: US 8,293,840 B2
(45) Date of Patent: Oct. 23, 2012

(54) COATING COMPOSITION

(75) Inventors: Tetsuya Masutani, Settsu (JP); Katsuhiko Imoto, Settsu (JP); Masaru Nagato, Settsu (JP); Susumu Wada, Settsu (JP); Haruhiko Mohri, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 141 days.

(21) Appl. No.: 12/684,334

(22) Filed: Jan. 8, 2010

(65) Prior Publication Data

US 2010/0113662 A1 May 6, 2010

Related U.S. Application Data

(63) Continuation of application No. 10/541,451, filed as application No. PCT/JP2004/000525 on Jan. 22, 2004, now Pat. No. 7,807,752.

(30) Foreign Application Priority Data

Jan. 27, 2003 (JP) .................................. 2003-17882

(51) Int. Cl.
*C08L 27/04* (2006.01)

(52) U.S. Cl. ....................................................... 525/104

(58) Field of Classification Search .................. None
See application file for complete search history.

(56) References Cited

U.S. PATENT DOCUMENTS

| | | | |
|---|---|---|---|
| 4,732,941 A * | 3/1988 | Numa | ............................. 525/276 |
| 5,045,599 A | 9/1991 | Murase | |
| 5,321,083 A | 6/1994 | Hanada et al. | |
| 5,621,042 A | 4/1997 | Hanada et al. | |
| 6,072,008 A * | 6/2000 | Matsuno et al. | ............ 525/330.3 |
| 6,114,446 A | 9/2000 | Narisawa et al. | |
| 6,239,212 B1 | 5/2001 | Green | |
| 6,682,830 B2 * | 1/2004 | Ogawa | .......................... 428/690 |
| 7,105,465 B2 * | 9/2006 | Patel et al. | ....................... 442/88 |
| 2002/0001735 A1 | 1/2002 | Ogawa | |
| 2003/0164480 A1 * | 9/2003 | Wu et al. | ......................... 252/572 |
| 2007/0166531 A1 * | 7/2007 | Ohnishi et al. | ................. 428/323 |

FOREIGN PATENT DOCUMENTS

| | | |
|---|---|---|
| EP | 0 329 260 | 8/1989 |
| EP | 0 700 975 | 3/1996 |
| EP | 0 774 499 | 5/1997 |
| EP | 0 995 778 | 4/2000 |
| JP | 2-286759 A * | 11/1990 |
| JP | 5-1257 | 1/1993 |
| JP | 7-70509 | 3/1995 |
| JP | 7-331174 | 12/1995 |
| JP | 8-245905 | 9/1996 |
| JP | 8-245906 | 9/1996 |
| JP | 8-333440 | 12/1996 |
| JP | 10-147746 | 6/1998 |
| JP | 2001-72928 | 3/2001 |
| JP | 2002-129112 | 5/2002 |
| WO | 93/13179 | 7/1993 |
| WO | 95/18188 | 7/1995 |

* cited by examiner

*Primary Examiner* — Marc Zimmer
(74) *Attorney, Agent, or Firm* — Sughrue Mion, PLLC

(57) ABSTRACT

There is provided a coating composition which comprises (A) a synthetic resin having functional group, (B) a stain-proofing component which is a liquid polydialkylsiloxane having functional group or a liquid fluoropolyether having functional group and (C) a curing agent, and the composition is excellent in a stain-proofing property, particularly removability of oily stain, thereby enabling scribbling to be easily wiped off, and is suitable for outdoor coating being excellent in weather resistance and adhesion.

6 Claims, No Drawings

COATING COMPOSITION

CROSS REFERENCE TO RELATED APPLICATIONS

This application is a continuation of U.S. application Ser. No. 10/541,451 filed Jul. 6, 2005, which is a U.S. National Stage Application of PCT/JP2004/000525 filed Jan. 22, 2004, which claims benefit of Japanese Application No. 2003-17882 filed Jan. 27, 2003, the above-noted applications are incorporated herein by reference in their entirety.

TECHNICAL FIELD

The present invention relates to a coating composition which has good adhesion to a substrate and provides a coating film being excellent particularly in stain removability.

BACKGROUND ART

There are many cases where a water-repellent stain-proofing coating film is formed on surfaces of various substrates, for example, stone, concrete, metal, plastic, wood and the like to prevent adhesion of stain and easily remove stain. Such a stain-proofing coating composition is roughly classified into (1) an inorganic coating composition mainly comprising a silicone compound (for example, JP64-45411A, etc.), (2) a curable coating composition comprising a fluorine-containing resin and an acrylic resin (for example, JP60-21686B, JP57-23662A, JP63-264675A, JP5-25422A, etc.), (3) a coating composition prepared by mixing a stain-proofing silicon-containing low molecular weight compound to a coating film forming resin (for example, JP1-51477A, JP9-78029A, WO98/22530, JP5-339538A, JP11-29722A, JP2-75649A, JP10-88065A, etc.) and the like. When forming the inorganic coating film of above (1) on a substrate surface, it is difficult to carry out coating uniformly continuously over the substrate surface, and a long-lasting stain proofing effect cannot be expected.

In the method of coating a water- and oil-repellent resin of above (2), strength of a coating film itself can be obtained but a stain-proofing effect is insufficient.

The coating composition of above (3) prepared by mixing a stain-proofing silicon-containing low molecular weight compound to a coating film forming resin is intended for compensating for problems of (1) and (2) above, but it is difficult to uniformly disperse the silicon-containing low molecular weight compound in the coating film forming resin and further to concentrate the silicon-containing low molecular weight compound around the coating film surface, and it is particularly difficult to maintain the silicon-containing low molecular weight compound around the surface for a long period of time. A coating composition providing a coating film which can maintain a stain-proofing effect for a long period of time has not yet been found out.

On the other hand, there have been trials to obtain a stain-proofing effect of a coating film surface by making the surface hydrophilic but not water- and oil-repellent. For example, WO97/11130 discloses a coating composition comprising a fluorine-containing resin as a coating film forming component and a tri-functional or tetra-functional fluorine-containing silicate compound (having 3 to 4 hydrolyzable groups) as a stain adherence inhibitor. However this coating composition is used for achieving a stain-proofing effect by hydrolyzing a fluorine-containing silicate concentrated around the coating film surface and making the surface hydrophilic with a hydrophilic group after hydrolyzation. A group having fluorine is a hydrolyzable group, and is released by hydrolyzation and does not exist around the coating film surface.

Further coating compositions for enhancing a property of preventing adherence of snow and ice and a property of sliding snow but not for giving a stain-proofing property have been proposed (for example, JP4-85369A, JP58-132073A, etc.). JP4-85369A discloses that a silicone- or fluorine-containing water-repellent agent having no functional group and a lubricant are mixed to a hydroxyl-containing chlorotrifluoroethylene copolymer. Also JP58-132073A discloses that a silicone oil is mixed to an air drying vinyl resin or acrylic resin having no functional group. However even if a coating film is formed by using the compositions disclosed in those patent publications, since a water-repellent agent, lubricant and silicone oil in the coating film bleed or are released from the film surface, there is a problem that a property of maintaining the effects thereof is insufficient.

An object of the present invention is to provide a coating composition which can make a coating film surface water- and oil-repellent and can maintain a stain-proofing effect, particularly stain removability and a property of wiping off stain for a long period of time even in case of outdoor use.

DISCLOSURE OF INVENTION

The present invention relates to a coating composition comprising (A) a synthetic resin having functional group X, (B) a stain-proofing component and (C) a curing agent, in which the stain-proofing component (B) is (B1) a liquid polydialkylsiloxane having functional group $Y^1$ being capable of reacting with the functional group X and/or the curing agent (C) or (B2) a liquid fluoropolyether having functional group $Y^2$ being capable of reacting with the functional group X and/or the curing agent (C) or
a coating composition which comprises (A) a synthetic resin having functional group X and (B) a stain-proofing component and does not contain a curing agent, in which the stain-proofing component (B) is (B1) a liquid polydialkylsiloxane having functional group $Y^1$ being capable of reacting with the functional group X or (B2) a liquid fluoropolyether having functional group $Y^2$ being capable of reacting with the functional group X.

Examples of the resin (A) are a fluorine-containing resin having functional group, a non-fluorine-containing acrylic resin having functional group, a polyester resin having functional group, a urethane resin having functional group and/or an epoxy resin having functional group. Examples of the preferred functional group X of the resin (A) are hydroxyl, carboxyl, epoxy, amino, carbonyl, nitrile and/or hydrolyzable alkyl silicate residue.

The functional group $Y^1$ of the polydialkylsiloxane (B1) is a functional group being capable of reacting with at least one functional group X. Preferred are hydroxyl, amino, epoxy, carboxyl, thiol, $-(C_2H_4O)_a-(C_3H_6O)_bR^1$, in which $R^1$ is an alkyl group having 1 to 8 carbon atoms, a and b are the same or different and each is an integer of from 1 to 40, and/or hydrolyzable alkyl silicate residue. Also the functional group $Y^2$ of the fluoropolyether (B2) is a functional group being capable of reacting with at least one functional group X. Preferred are hydroxyl, amino, epoxy, carboxyl, thiol, nitrile, iodine atom and/or hydrolyzable alkyl silicate residue.

The hydrolyzable alkyl silicate residue in the functional proofing component (B) is preferably a silicon-containing functional group represented by $-SiR^2_{3-m}(OR^3)_m$, in which $R^2$ is a non-hydrolyzable hydrocarbon group which has 1 to 18 carbon atoms and may have fluorine atom; $R^3$ is a hydrocarbon group having 1 to 18 carbon atoms; m is an integer of from 1 to 3.

The coating composition of the present invention may contain or may not contain the curing agent (C). When the curing agent (C) is contained, it is optionally selected depending on kind of the functional group and is preferably at least one selected from the group consisting of, for example, an isocyanate compound, amino compound, epoxy compound, organic acid, hydrazide compound, aziridine compound, carbodiimide compound and/or $Si(OR^4)_4$, in which $R^4$ is a non-fluorine-containing alkyl group having 1 to 10 carbon atoms, $R^5Si(OR^6)_3$, in which $R^5$ and $R^6$ are the same or different and each is a non-fluorine-containing alkyl group having 1 to 10 carbon atoms, and solely condensed oligomers and co-condensed co-oligomers thereof.

Non-limiting combinations of components of the coating composition are, for example;

(1) A combination of the resin (A) having hydroxyl as the functional group X, the stain-proofing component (B) having hydroxyl or amino as the functional group $Y^1$ or $Y^2$ (hereinafter there is a case where the both are generically referred to as "functional group Y") and an isocyanate compound as the curing agent (C). In this case, preferred as the curing agent (C) is an isocyanate compound having a hydrolyzable alkyl silicate residue.

(2) A combination of the resin (A) having carboxyl as the functional group X, the stain-proofing component (B) having carboxyl, amino or epoxy as the functional group Y and an amino compound, an epoxy compound, an aziridine compound or a carbodiimide compound as the curing agent (C).

(3) A combination of the resin (A) having amino as the functional group X, the stain-proofing component (B) having amino or carboxyl as the functional group Y and an epoxy compound or an organic acid as the curing agent (C).

(4) A combination of the resin (A) having carbonyl or carboxyl as the functional group X, the stain-proofing component (B) having amino or carboxyl as the functional group Y and an epoxy compound or a hydrazide compound as the curing agent (C).

(5) A combination of the resin (A) having epoxy as the functional group X, the stain-proofing component (B) having amino or epoxy as the functional group Y and an organic acid or an amino compound as the curing agent (C).

Examples of preferred combinations of components of the coating composition containing no curing agent are:

(6) A combination of the resin (A) having a hydrolyzable alkyl silicate residue as the functional group X and the stain-proofing component (B) having hydroxyl or a hydrolyzable alkyl silicate residue as the functional group Y, and (7) A combination of the resin (A) having hydroxyl as the functional group X and the stain-proofing component (B) having a hydrolyzable alkyl silicate residue as the functional group Y. In such a case, it is preferable that the coating composition further contains the curing catalyst (D).

In the combination of above (1), it is preferable that the functional group $Y^1$ or $Y^2$ of the stain-proofing component (B) is amino.

Also preferred as the curing agent (C) is a combination use of an isocyanate compound with $Si(OR^4)_4$, in which $R^4$ is a non-fluorine-containing alkyl group having 1 to 10 carbon atoms, solely condensed oligomer and/or co-condensed co-oligomer.

It is preferable that a hydroxyl value of the resin (A) is from 10 to 300 mgKOH/g and that an amino equivalence of the stain-proofing component (B) is not less than 1,000.

Preferred as the resin (A) is a fluorine-containing resin having functional group, particularly a fluorine-containing resin having functional group which has a fluorine content of not less than 10% by mass since water repellency and stain-proofing property are excellent.

In the coating composition of the present invention, the proportions of the resin (A) and the stain-proofing component (B) are not limited particularly. It is preferable that the proportion of the stain-proofing component (B) is not less than 0.01 part by weight, particularly not less than 0.1 part by weight and not more than 50 parts by weight, particularly not more than 20 parts by weight to 100 parts by weight of the resin (A).

The coating composition of the present invention may be formed into an organic solvent type coating composition containing an organic solvent or may be dispersed in an aqueous medium to prepare an aqueous dispersion type coating composition.

BEST MODE FOR CARRYING OUT THE INVENTION

In the coating composition of the present invention, it can be considered that an excellent stain-proofing property can be imparted to the coating film surface by chemically bonding the specific stain-proofing component (B) with the resin (A) by chemically bonding the functional group of the component (B) with the functional group of the resin (A) by direct condensation or via the curing agent (C), thereby making the specific stain-proofing component (B) being present at high concentration around a surface of the obtained coating film.

First, the stain-proofing component as the component (B) is explained below. There can be used a liquid polydialkylsiloxane (B1) having functional group and a liquid fluoropolyether (B2) having functional group, as the component (B). In the present invention, a liquid form means being in the form of liquid or wax at room temperature (25° C.).

The polydialkylsiloxane (B1) having functional group is an oligomer or co-oligomer in which not less than 2, preferably not less than 10 and not more than 10,000, preferably not more than 1,000 of dialkylsiloxanes of the same or different kinds are condensed. Examples thereof are compounds having, as the functional group $Y^1$, one or more, preferably not more than 1,000 of hydroxyl, amino, epoxy, carboxyl, thiol, $—(C_2H_4O)_a—(C_3H_6O)_bR^1$, in which $R^1$ is an alkyl group having 1 to 8 carbon atoms, a and b are the same or different and each is an integer of from 1 to 40, and/or hydrolyzable alkyl silicate residues, as mentioned above.

Preferred as the hydrolyzable alkyl silicate residue is a silicon-containing functional group represented by $—SiR^2_{3-m}(OR^3)_m$, in which $R^2$ is a non-hydrolyzable hydrocarbon group which has 1 to 18 carbon atoms and may have fluorine atom; $R^3$ is a hydrocarbon group having 1 to 18 carbon atoms; m is an integer of from 1 to 3.

Examples of $R^2$ are, for instance, methyl, ethyl, propyl and the like.

Examples of $R^3$ are, for instance, methyl, ethyl, propyl and the like, and methyl is preferred particularly from the viewpoint of excellent reactivity (hydrolyzability).

While m is an integer of from 1 to 3, m is preferably 3 from the viewpoint of excellent hydrolyzability.

The polydialkylsiloxane (B1) having functional group is concretely represented by the formula (1):

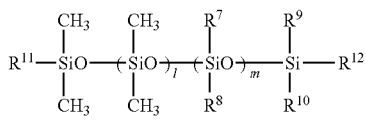

(1)

wherein $R^7$, $R^8$, $R^9$, $R^{10}$, $R^{11}$ and $R^{12}$ are the same or different and each is an alkyl group having 1 to 8 carbon atoms, Rf group, in which Rf is a linear or branched fluoroalkyl group which has 1 to 18 carbon atoms and may have the functional group $Y^1$, and may have oxygen atom and/or nitrogen atom in the midst of the chain, or —$R^{13}$—$Y^1$, in which $R^{13}$ is a divalent hydrocarbon group which has from 0 to 14 carbon atoms and may have oxygen atom and/or nitrogen atom and $Y^1$ is the above-mentioned functional group, and at least one of $R^7$, $R^8$, $R^9$, $R^{10}$, $R^{11}$ and $R^{12}$ contains $Y^1$; l is an integer of from 1 to 10,000; m is an integer of from 1 to 1,000.

$R^7$, $R^8$, $R^9$, $R^{10}$, $R^{11}$ and $R^{12}$ are non-hydrolyzable groups. Examples thereof are preferably an alkyl group having no functional group such as $CH_3$, $C_2H_5$ or $C_3H_7$; an alkyl group having functional group such as $Y^1$—$CH_2$—, $Y^1$—$CH_2CH_2$— or $Y^1$—$CH_2CH_2CH_2$—; a fluorine-containing alkyl group having no functional group such as —$CH_2$—$Rf^1$ or —$CH_2CH_2$—$Rf^1$, in which $Rf^1$ is a fluoroalkyl group which has no functional group $Y^1$ and has from 1 to 18 carbon atoms; a fluorine-containing alkyl group having functional group such as —$CH_2$—$Rf^2$, —$CH_2CH_2$—$Rf^2$ or —$CH_2CH_2CH_2$—$Rf^2$, in which $Rf^2$ is a fluoroalkyl group which has the functional group $Y^1$ and has from 1 to 18 carbon atoms; and the like.

Examples of $Rf^1$ are as follows.

(1) Fluoroalkyl Group Having no Functional Group
$C_4F_9C_2H_4$—, $C_8F_{17}C_2H_4$—, $C_9F_{19}C_2H_4$—, $C_4F_9SO_2N(CH_3)C_2H_4$—, $C_4F_9C_2H_4N(CH_3)C_3H_9$— and the like.

(2) Fluoroether Group Having No Functional Group
$CF_3OCF_2CF_2O$—$C_2H_4$—, $CF_3(CF_2CF_2O)_2$—$C_2H_4$—, $CF_3O(CF_2O)_2$—$(CF_2CF_2O)_2$—, $CF_3CF_2CF_2O(CF_2CF_2CF_2O)_7$, F—$(C_3F_6O)_6$—$(C_2F_4O)_2$— and the like.

Examples of $Rf^2$ are as follows.

(3) Fluoroalkyl Group Having Functional Group
$OHC_2H_4CF_2CF_2CF_2CF_2C_2H_4$—,
$HOOCCF_2CF_2CF_2CF_2C_2H_4$— and the like.

(4) Fluoroether Group Having Functional Group
$HOCH_2CF_2O(CF_2CF_2O)_3$—$C_2H_4$—, $HOOCCF_2O(CF_2CF_2O)_3$—$C_2H_4$— and the like.

From the viewpoint of excellent water- and oil-repellency, at least one of them is preferably the no-functional fluoroalkyl group or no-functional fluoroether group.

Examples of the functional group $Y^1$ are those mentioned supra. It is preferable that the functional group $Y^1$ is so bonded as in the forms mentioned below:

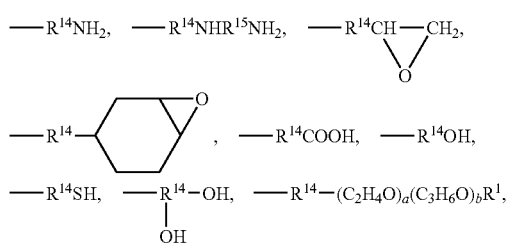

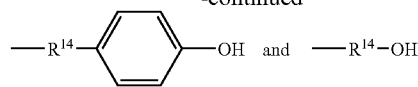

wherein $R^1$ is as defined above, $R^{14}$ is an alkylene group having from 0 to 8 carbon atoms, $R^{15}$ is an alkylene group having from 0 to 8 carbon atoms.

Non-limiting examples of commercially available polydialkylsiloxane which are classified by kind of the functional group $Y^1$ are as follows.

When the functional group $Y^1$ is OH:
Silaplaine FM-4421, FM-0421, FM-0411, FM-0425, FM-DA11, FM-DA21 and the like available from Chisso Corporation
KF-6001, KF-6002, X-22-4015, X-22-176DX and the like available from Shin-Etsu Chemical Co., Ltd.

When the functional group $Y^1$ is $NH_2$ or —$R^{14}$—NH—$R^{15}$—$NH_2$:
Silaplaine FM-3321, FM-3311, FM-3325 and the like available from Chisso Corporation
KF-860, KF-861, KF-865, KF-8002, X-22-161B and the like available from Shin-Etsu Chemical Co., Ltd.
FZ-3501, FZ-3789, FZ-3508, FZ-3705, FZ-4678, FZ-4671, FZ-4658 and the like available from Nippon Unicar Company Limited When the functional group $Y^1$ is epoxy:
Silaplaine FM-0521, FM-5521, FM-0511, FM-0525 and the like available from Chisso Corporation
KF-101, X-22-163B, X-22-169B and the like available from Shin-Etsu Chemical Co., Ltd.
L-9300, FZ-3736, FZ-3720, LE-9300, FZ-315 and the like available from Nippon Unicar Company Limited When the functional group $Y^1$ is COOH:
X-22-162C, X-22-3701E and the like available from Shin-Etsu Chemical Co., Ltd.
FZ-3703 and the like available from Nippon Unicar Company Limited When the functional group $Y^1$ is SH:
KF-2001, X-22-167B and the like available from Shin-Etsu Chemical Co., Ltd.

When the functional group $Y^1$ is —$(C_2H_4O)_a(C_3H_6O)_bR^1$:
KF-353, KF-355A, KF-6015 and the like available from Shin-Etsu Chemical Co., Ltd.

Then the fluoropolyether (B2) having functional group is explained below.

The fluoropolyether (B2) having functional group is a fluoropolyether having at least one functional group $Y^2$. Examples of the functional group $Y^2$ are hydroxyl, amino, epoxy, carboxyl, thiol, nitrile, iodine atom and/or a hydrolyzable alkyl silicate residue.

As the fluoropolyether (B2) having functional group, preferred are fluoropolyethers having functional group represented by the formula (2):

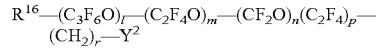

wherein $R^{16}$ is H, an alkyl group having from 1 to 8 carbon atoms, F or $C_qF_{2q+1}O$— (q=1 to 5); $Y^2$ is as defined above; l, m, n, p and r are the same or different and each is 0 or an integer of from 1 to 200 and there is no case where all of l, m, n, p and r are zero.

Examples of $R^{16}$ are, for instance, H or F; a non-fluorine-containing alkyl group having 1 to 8 carbon atoms such as methyl, ethyl, propyl or butyl; a perfluoroalkoxy group having 1 to 15 carbon atoms such as $CF_3$ or $C_2F_5$; $Y^2$—$(CH_2)_s$—$C_qF_{2q}O$—, in which s is an integer of from 0 to 200 and the like. Particularly preferred is a perfluoroalkoxy group from the viewpoint of excellent water- and oil-repellency.

Examples of the functional group $Y^2$ are those mentioned above, and it is preferable that the functional group $Y^2$ is bonded in the forms raised below.

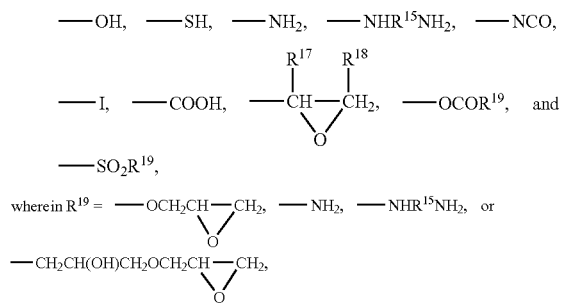

in which $R^{15}$ is as defined above, $R^{17}$ and $R^{18}$ are the same or different and each is H or an alkyl group having 1 to 4 carbon atoms.

Non-limiting examples of the oligomer which are classified by kind of the functional group $Y^2$ are as follows.
When the functional group $Y^2$ is OH:
$F(C_3F_6O)_nCF_2CF_2CH_2OH$ (n=10 to 14), $OHCH_2CF_2O(CF_2CF_2O)_n$—$(CFO)_m$—$CF_2CH_2OH$ (an average of n is 25 and an average of m is 5) and the like.
When the functional group $Y^2$ is $NH_2$ or —NH—$R^{15}$—$NH_2$: $F(C_3F_6O)_nCF_2CF_2CH_2NH_2$ (an average of n is 12) and the like.
When the functional group $Y^2$ is epoxy:

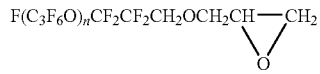

(an average of n is 16) and the like.
When the functional group $Y^2$ is COOH:
$F(C_3F_6O)_nCF_2CF_2COOH$ (an average of n is 25) and the like.
When the functional group $Y^2$ is I (iodine):
$F(C_3F_6O)_nCF_2CF_2I$ (an average of n is 10) and the like.

In addition, there can be used those disclosed, for example, in U.S. Pat. No. 5,279,820.

The coating composition of the present invention comprises such a stain-proofing component (B) as mentioned above and the synthetic resin having functional group as the component (A).

Examples of the resin as the component (A) are a fluorine-containing resin having functional group, a non-fluorine-containing acrylic resin having functional group, a polyester resin having functional group, a urethane resin having functional group and/or an epoxy resin having functional group. Examples of the functional group X of the resin (A) are preferably hydroxyl, carboxyl, epoxy, amino, carbonyl, nitrile and/or a hydrolyzable alkyl silicate residue.

Among them, more preferred are hydroxy and a hydrolyzable alkyl silicate residue from the viewpoint of excellent reactivity with the functional group $Y^1$ or $Y^2$ of the stain-proofing component (B) and good reactivity with the curing agent such as an isocyanate compound to be used as case demands and further from the point that adhesion can be improved.

Embodiments of the fluorine-containing resin (A1) having functional group are as follows.

(I) Copolymer of fluoroolefin with non-fluorine-containing monomer having functional group
(II) Copolymer of fluoroolefin having functional group with fluoroolefin having no functional group
(III) Blend of fluorine-containing resins having functional group prepared by blending two or more resins
(IV) Composite resin (seed polymer) prepared by seed-polymerizing non-fluorine-containing monomer having functional group with fluorine-containing resin particles Examples of the fluoroolefin are tetrafluoroethylene (TFE), hexafluoropropylene (HFP), chlorotrifluoroethylene (CTFE), perfluoro(alkyl vinyl ether), trifluoroethylene, vinylidene fluoride (VdF), vinyl fluoride and the like. Examples of the fluoroolefin having functional group are, for instance, those raised below.

wherein Z is $SO_3M$ or COOM, in which M is H, $NH_4$ or an alkali metal; a is an integer of from 1 to 10.
Examples thereof are $CF_2$=$CFCF_2$—COOH and the like.

wherein Z is $SO_3M$ or COOM, in which M is H, $NH_4$ or an alkali metal; b is an integer of from 1 to 5.
Examples thereof are $CF_2$=$CFCF_2CF(CF_3)$—COOH, $CF_2$=$CF(CF_2CF(CF_3))_2$—$COONH_4$ and the like.

wherein $Rf^3$ is F or $CF_3$; Z is $SO_3M$ or COOM, in which M is H, $NH_4$ or an alkali metal; c is an integer of from 1 to 10.
Examples thereof are $CF_2$=CF—O—$CF_2CF_2CF_2COOH$ and the like.

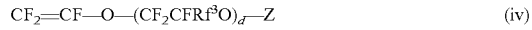

wherein $Rf^3$ is F or $CF_3$; Z is $SO_3M$ or COOM, in which M is H, $NH_4$ or an alkali metal; d is an integer of from 1 to 10.
Examples thereof are $CF_2$=CF—O—$CF_2CF(CF_3)$ $OCF_2CF_2COOH$, $CF_2$=CF—O—$CF_2CF(CF_3)$ $OCF_2CF_2SO_3H$ and the like.

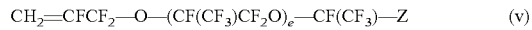

wherein Z is $SO_3M$ or COOM, in which M is H, $NH_4$ or an alkali metal; e is 0 or an integer of from 1 to 10.
Examples thereof are $CH_2$=$CFCF_2O$—$(CF(CF_3)CF_2O)_2$—$CF(CF_3)COONH_4$, $CH_2$=$CFCF_2O$—$CF(CF_3)CF_2O$—CF $(CF_3)COONH_4$ and the like.

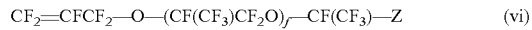

wherein Z is $SO_3M$ or COOM, in which M is H, $NH_4$ or an alkali metal; f is an integer of from 1 to 10.
Examples thereof are $CF_2$=$CFCF_2O$—$CF(CF_3)CF_2O$—$CF(CF_3)COOH$, $CF_2$=$CFCF_2O$—$CF(CF_3)CF_2O$—CF $(CF_3)SO_3H$ and the like.

Among the non-fluorine-containing monomers having functional group, examples of the non-fluorine-containing monomers having hydroxyl are hydroxyallylether or hydroxyalkyl vinyl ether which is represented by the formula: $CH_2$=$CHR^{30}$, wherein $R^{30}$ is —$OR^{31}$ or —$CH_2OR^{31}$, in which $R^{31}$ is an alkyl group having hydroxyl. Example of $R^{31}$ is a linear or branched alkyl group having 1 to 8 carbon atoms in which one to three, preferably one hydroxyl is bonded. Examples thereof are, for instance, 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, glycerol monoallyl ether and the like. In addition, there are allyl alcohol and the like.

Examples of the non-fluorine-containing monomer having a hydrolyzable alkyl silicate residue are, for instance, vinylalkoxysilanes such as vinyltrimethoxysilane, vinyltriethoxysilane, vinyltripropoxysilane and vinylmethyldimethoxysilane, trimethoxysilylethyl vinyl ether, triethoxysilylethyl vinyl ether, triethoxysilylpropyl vinyl ether, triisopropenyloxysilylethyl vinyl ether, γ-(meth)acryloyloxypropyltrimethoxysilane and the like.

Examples of the non-fluorine-containing monomer having carboxyl are organic acids having an unsaturated group represented by the formula (12) or (13) mentioned infra, for instance, monomers having carboxyl such as acrylic acid, methacrylic acid, vinylacetic acid, crotonic acid, cinnamic acid, itaconic acid, itaconic acid monoester, itaconic acid anhydride, succinic acid anhydride, maleic acid, maleic acid monoester, maleic anhydride, fumaric acid, fumaric acid monoester, vinyl phthalate, vinyl pyromellitate and 3-allyloxypropionic acid.

Non-limiting examples of other non-fluorine-containing monomer having functional group are epoxy-containing monomers such as (meth)acrylic acid glycidyl, epoxy vinyl and epoxy vinyl ether; amino-containing monomers such as diacetone acrylamide, (meth)acrylamide and N-methylol (meth)acrylamide; nitrile-containing monomers such as (meth)acrylonitrile; and carbonyl-containing monomers such as acrolein and vinyl ethyl ketone.

Also the above-mentioned monomers having no functional group may be used as a comonomer. There can be used, for example, a-olefins such as ethylene, propylene and isobutylene; vinyl ethers such as ethyl vinyl ether (EVE), cyclohexyl vinyl ether (CHVE), butyl vinyl ether, isobutyl vinyl ether, methyl vinyl ether and polyoxyethylene vinyl ether; alkenyls such as polyoxyethylene allyl ether, ethyl allyl ether and allyl ether; vinyl esters such as vinyl acetate, vinyl lactate, vinyl butyrate, vinyl pivalate, vinyl benzoate and VEOVA9 and VEOVA10 (both are saturated vinyl carboxylates available from Shell Kagaku); unsaturated dicarboxylic acid ester such as dimethyl maleate; (meth)acrylic acid esters such as methyl methacrylate and butyl acrylate; aromatic vinyl compounds such as styrene and vinyltoluene; and the like.

Among the copolymers of the above-mentioned embodiment (I), examples of the copolymer having hydroxyl are copolymers of the above-mentioned fluoroolefin with the above-mentioned monomer having functional group and as case demands, a monomer copolymerizable with those monomers. Representative examples of the monomer having hydroxyl are hydroxybutyl vinyl ether and the like, and representative examples of the monomer having carboxyl are maleic acid and the like. Examples of the other comonomer are alkyl vinyl esters, alkyl vinyl ethers, olefins such as ethylene, propylene and isobutene, (meth)acrylates, styrene and the like.

There are concretely copolymers disclosed, for example, in JP60-21686B, JP3-121107A, JP4-279612A, JP4-28707A, JP2-232221A, etc. A number average molecular weight (by GPC) of the copolymer is from 1,000 to 100,000, preferably from 1,500 to 30,000. If the molecular weight is less than 1,000, there is a tendency that curability and weather resistance tend to be insufficient, and if the molecular weight exceeds 100,000, there is a tendency that problems with workability and coatability arise.

More concretely non-limiting examples of the copolymers are a TFE/alkyl vinyl ether/HBVE copolymer, CTFE/alkyl vinyl ether/HBVE copolymer, TFE/alkyl vinyl ether/maleic acid copolymer, CTFE/alkyl vinyl ether/maleic acid copolymer and the like.

A hydroxyl value of the above-mentioned copolymer is from 0 to 300 (mgKOH/g), preferably from 0 to 200 (mgKOH/g), more preferably from 0 to 150 (mgKOH/g). If the hydroxyl value decreases, there is a tendency that a curing failure easily arises, and if the hydroxyl value exceeds 200 (mgKOH/g), there is a tendency that a problem with flexibility of a coating film arises.

An acid value of the above-mentioned copolymer is from 0 to 200 (mgKOH/g), preferably from 0 to 100 (mgKOH/g). If the acid value decreases, there is a tendency that a curing failure easily arises, and if the acid value exceeds 200 (mgKOH/g), there is a tendency that a problem with flexibility of a coating film arises.

Examples of the commercially available copolymer are for instance, ZEFFLE available from DAIKIN INDUSTRIES, LTD., Lumiflon available from Asahi Glass Kabushiki Kaisha, Cefral Coat available from Central Glass Kabushiki Kaisha, Fluonate available from Dai Nippon Ink Kagaku Kogyo Kabushiki Kaisha, Zaflon available from Toa Gosei Kabushiki Kaisha and the like.

Among the fluorine-containing copolymers (I) having functional group, examples of the fluoroolefin resin having a hydrolyzable alkyl silicate residue are copolymers disclosed, for example, in JP4-4246A, etc. A number average molecular weight (by GPC) of the copolymer is from 1,000 to 100,000, preferably from 1,500 to 30,000. If the molecular weight is less than 1,000, there is a tendency that curability and weather resistance tend to be insufficient, and if the molecular weight exceeds 100,000, there is a tendency that problems with workability and coatability arise.

Concretely there are copolymers such as a copolymer comprising TFE and vinylmethoxysilane and a copolymer comprising TFE and trimethoxysilylethyl vinyl ether.

A content of the hydrolyzable alkyl silicate residue of the above-mentioned copolymer is from 1 to 50% by mole, preferably from 5 to 40% by mole. If the content of hydrolyzable alkyl silicate residue decreases, a curing failure tends to arise, and if the content becomes too large, there is a tendency that a problem with flexibility of a coating film arises.

Other examples of the copolymer (I) are, for instance, a CTFE/ethyl vinyl ether/2-hydroxybutyl vinyl ether copolymer, TFE/cyclohexyl vinyl ether/VEOVA10/crotonic acid copolymer and the like.

Examples of the copolymer (II) are, for instance, copolymers of TFE/HFP/fluorine-containing monomer having functional group represented by the above-mentioned formulae (i) to (vi) and the like.

Among the copolymers comprising the fluorine-containing monomer having functional group, preferred are those having a relatively high fluorine content from the viewpoint of good stain-proofing property and weather resistance and a low refractive index. It is preferable that the fluorine content is not less than 10% by mass, further not less than 20% by mass, particularly not less than 30% by mass. An upper limit of the fluorine content is a fluorine content of a perfluoro-resin in which hydrogen atoms have been replaced with fluorine atoms.

Also it is preferable that a refractive index of the copolymers comprising the fluorine-containing monomer having functional group is low from the viewpoint of excellent transparency and improvement of clearness. A preferable refractive index is not more than 1.6, particularly not more than 1.5, and a lower limit is usually 1.3.

Examples of the blend (III) are a blend of the copolymers (I), a blend of the copolymers (II), a blend of the copolymer (I) and/or the copolymer (II) and the non-fluorine-containing resin having functional group, a blend of the copolymer (I) and/or the copolymer (II) and the non-fluorine-containing resin having no functional group, a blend of the non-fluorine-containing resin having functional group and the fluorine-containing resin having no functional group and the like.

Examples of the non-fluorine-containing resin having functional group are the above-mentioned (co)polymers of monomers having functional group. Concretely there are preferably acrylic polyol, urethane polyol and the like. Examples of the non-fluorine-containing resin having no functional group are, for instance, an acrylic resin, polyester and the like. Examples of the fluorine-containing resin having no functional group are, for instance, VdF polymers such as VdF homopolymer, VdF/TFE copolymer, VdF/HFP copolymer, VdF/CTFE copolymer, VdF/TFE/CTFE copolymer and VdF/TFE/HFP copolymer; TFE/HFP copolymer; copolymers of a fluoroolefin with a non-fluorine-containing monomer having no functional group (for example, vinyl ethers, vinyl esters, α-olefins, aromatic vinyl compounds) and the like.

A blending ratio may be optionally selected depending on the content of functional groups, fluorine content, etc. It is usually desirable from the viewpoint of an excellent effect of maintaining a stain-proofing property that the blending is so carried out that the amount of functional groups is sufficient enough to enable the functional groups to react with the stain-proofing component (B) and further with the curing agent (C).

Examples of the composite resin (seed polymer) (IV) are preferably those prepared by seed-polymerizing a non-fluorine-containing monomer having functional group in an aqueous dispersion of the above-mentioned fluorine-containing resin particles having functional group or not having functional group. Concretely preferred are composite resins prepared by seed-polymerizing acrylic acid, methacrylic acid, (meth)acrylic acid ester or vinyl compound having functional group in an aqueous dispersion of VdF copolymer particles.

The above-mentioned fluorine-containing resins having functional group can be used in the form of organic solvent type coating composition or aqueous dispersion type coating composition, and particularly composite resins are useful as an aqueous dispersion type coating composition.

When using as an aqueous dispersion type coating composition, a solid content is from about 20% by weight to about 70% by weight, preferably from about 30% by weight to about 60% by weight from the viewpoint of excellent stability at forming into a coating. An average particle size is from about 50 nm to about 300 nm, preferably from about 100 nm to about 250 nm from the viewpoint of excellent stability of the aqueous dispersion. It is preferable that a pH value is usually within a range of from 5 to 10.

Preferred as the non-fluorine-containing acrylic resin (A2) having functional group are acrylic polyol resins or acrylic silicon resins raised below.

The acrylic polyol resin may be a polymer comprising, for example, the following hydroxyl-containing polymerizable unsaturated monomer (a) and if necessary, other polymerizable unsaturated monomer (b) as monomer components.

As the monomer (a), there can be exemplified compounds represented by the following formulae (8) to (11).

wherein $R^{20}$ is hydrogen atom or a hydroxyalkyl group.

wherein $R^{20}$ is as define above.

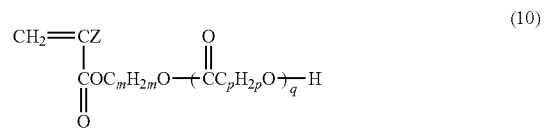

wherein Z is hydrogen atom or methyl, m is an integer of 2 to 8, p is an integer of 2 to 18, q is 0 or an integer of 1 to 7.

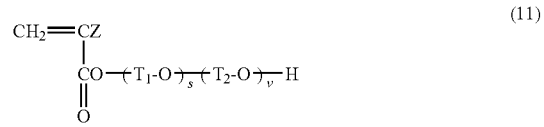

wherein Z is as defined above, $T_1$ and $T_2$ are the same or different and each is a divalent hydrocarbon group having 1 to 20 carbon atoms, each of s and v is 0 or an integer of 1 to 10, provided that the sum of s and v is from 1 to 10.

The hydroxyalkyl group in the formulae (8) and (9) is one having alkyl moiety of 1 to 6 carbon atoms. Examples are —$C_2H_4OH$, —$C_3H_6OH$, —$C_4H_8OH$ and the like.

Examples of the divalent hydrocarbon group having 1 to 20 carbon atoms in the formula (11) are, for instance,

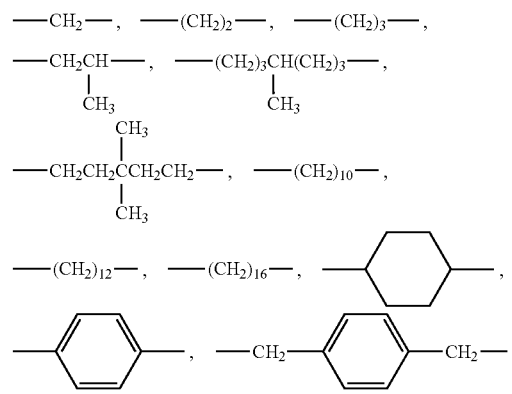

and the like.

Examples of the monomer component of the formula (8) are, for instance,

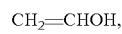

and the like.

Examples of the monomer component of the formula (9) are, for instance,

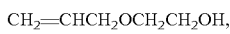

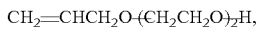

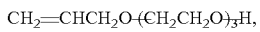

and the like.

Examples of the monomer component of the formula (10) are, for instance,

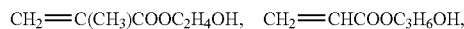

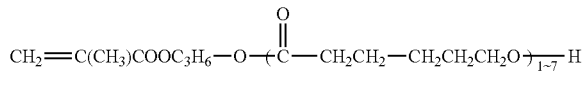

and the like.

Examples of the monomer component of the formula (11) are, for instance,

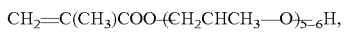

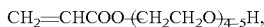

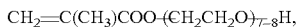

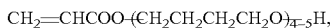

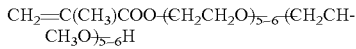

and the like.

In addition, there can be used an adduct of the hydroxyl-containing unsaturated monomer represented by the formulae (8) to (11) and lactone such as ε-caprolactone or γ-valerolactone.

Examples of other polymerizable unsaturated monomer (b) are those of the following (b-1) to (b-9).

(b-1) Olefin compound: For example, ethylene, propylene, butylene, isoprene, chloroprene and the like.

(b-2) Vinyl ether and allyl ether: For example, linear alkyl vinyl ether such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether or 4-methyl-1-pentyl vinyl ether; cycloalkyl vinyl ether such as cyclopentyl vinyl ether or cyclohexyl vinyl ether; aryl vinyl ether such as phenyl vinyl ether or o-, m- or p-trivinyl ether; arylalkyl vinyl ether such as benzyl vinyl ether or phenethyl vinyl ether; and the like.

(b-3) Vinyl ester and propenyl ester: For example, vinyl ester such as vinyl acetate, vinyl lactate, vinyl butyrate, vinyl isobutyrate, vinyl caproate, vinyl isocaproate, vinyl pivalate or vinyl caprate; propenyl ester such as isopropenyl acetate or isopropenyl propionate; and the like.

(b-4) Acrylate or methacrylate: For example, C1 to 18 alkyl ester of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate or lauryl methacrylate; C2 to 18 alkoxyalkyl ester of acrylic acid or methacrylic acid such as methoxybutyl acrylate, methoxybutyl methacrylate, methoxyethyl acrylate, methoxyethyl methacrylate, ethoxybutyl acrylate or ethoxybutyl methacrylate; and the like.

(b-5) Aromatic vinyl compound: For example, styrene, α-methylstyrene, vinyltoluene, p-chlorostyrene and the like.

(b-6) Others: Acrylonitrile, methacrylonitrile and the like.

(b-7) Carboxyl-containing monomer: Carboxyl-containing vinyl monomer represented by the formula (12):

wherein $R^{21}$, $R^{22}$ and $R^{23}$ are the same or different and each is hydrogen atom, alkyl, phenyl, carboxyl or ester group, n is 0 or 1, or the formula (13):

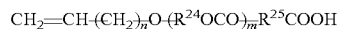

wherein $R^{24}$ and $R^{25}$ are the same or different and each is saturated or unsaturated linear or cyclic alkyl, n is 0 or 1, m is 0 or 1. Examples thereof are, for instance, acrylic acid, methacrylic acid, vinylacetic acid, crotonic acid, cinnamic acid, 3-allyloxypropionic acid, itaconic acid, itaconic acid monoester, maleic acid, maleic acid monoester, maleic anhydride, fumaric acid, fumaric acid monoester, vinyl phthalate, vinyl pyromellitate and the like.

(b-8) Epoxy-containing monomer:

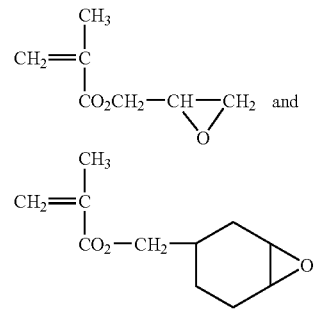

(b-9) Amino-containing monomer:

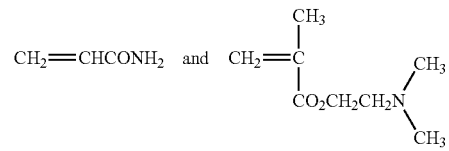

The acrylic polyol resin may contain hydroxyl, carboxyl, epoxy or amino, and hydroxyl is particularly preferred.

A hydroxyl value of the acrylic polyol resin is from 0 to 200 (mgKOH/g), preferably 0 to 100 (mgKOH/g). When the hydroxyl value decreases, curing failure tends to occur easily, and when the hydroxyl value exceeds 200 (mgKOH/g), there is a tendency that problem arises with respect to flexibility of a coating film.

As a commercially available acrylic polyol resin, there can be used, for example, Dianal available from Mitsubishi Rayon Kabushiki Kaisha, Acrydic available from Dai Nippon Ink Kagaku Kogyo Kabushiki Kaisha, Hitaloid available from Hitachi Chemical Co., Ltd., Olester available from Mitsui Toatsu Kagaku Kabushiki Kaisha, Acryset available from Nippon Shokubai Kabushiki Kaisha, Polysol available from Showa Kobunshi Kabushiki Kaisha, Mowinyl available from Clariant Polymer K.K. or the like.

The acrylic silicon resin may be one prepared by polymerizing the following acrylic silicon monomer with the compound of the formulae (8) to (11) and/or other polymerizable unsaturated monomer (b).

The acrylic silicon monomer is a compound having, in one molecule thereof, at least one silane group and a radically polymerizable unsaturated group. Examples of the radically polymerizable unsaturated group are, for instance:

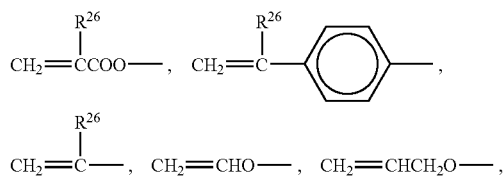

and the like, wherein $R^{26}$ is hydrogen atom or methyl.

As the silane-containing polymerizable unsaturated monomer having a radically polymerizable unsaturated group of:

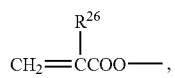

there is, for example, a compound represented by the following formula (14):

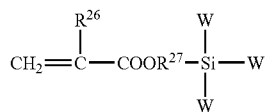

(14)

wherein $R^{27}$ is a hydrocarbon group having 1 to 20 carbon atoms, W are the same or different and each is a hydrogen atom, hydroxyl, a hydrolyzable group, an alkyl group having 1 to 8 carbon atoms, aryl or arylalkyl, provided that at least one of W is a hydrolyzable group.

Examples of the compound represented by the formula (14) are, for instance, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(meth)acryloxypropyldimethylethoxysilane, γ-(meth)acryloxypropylphenylmethylmethoxysilane, γ-(meth)acryloxypropylphenylmethylethoxysilane, γ-(meth)acryloxypropyltrisilanol, γ-(meth)acryloxypropylmethyldihydroxysilane, γ-(meth)acryloxybutylphenyldihydroxysilane, γ-(meth)acryloxypropyldimethylhydroxysilane, γ-(meth)acryloxypropylphenylmethylhydroxysilane and the like.

The acrylic silicon resin may have hydroxyl or epoxy.

As a commercially available acrylic silicon resin, there can be used, for example, Gemlac available from Kaneka Corporation, Kuriyamer available from Sanyo Kasei Kogyo Kabushiki Kaisha, Mowinyl available from Clariant Polymer K.K. and the like.

As a commercially available polyester resin (A3) having functional group, there are Espec available from Hitachi Kasei Kabushiki Kaisha, Desmophen available from Sumitomo Bayer Urethane Kabushiki Kaisha, Beckosol available from Dai Nippon Ink & Chemicals, Incorporated and the like.

As a commercially available urethane resin (A4) having functional group, there are Baybond available from Sumitomo Bayer Urethane Kabushiki Kaisha, SANCURE available from BF Goodrich Co., Ltd., Neorez available from Avecia, Daotan available from Clariant Polymer K.K. and the like.

As a commercially available epoxy resin (A5) having functional group, there are Epikote and Epirez available from Japan Epoxy Resins Co., Ltd. and the like.

For introducing other functional groups (carboxyl, epoxy, amino, carbonyl, nitrile) than hydroxyl and hydrolyzable alkyl silicate residue to the synthetic resin (A), for example, a monomer having such functional group may be copolymerized as a comonomer. Examples of the monomer having such functional group are (meth)acrylic acid, maleic acid, succinic anhydride and the like for introducing carboxyl; glycidyl (meth)acrylate and the like for introducing epoxy; diacetone acrylamide, acrylamide and the like for introducing amino; (meth)acrylonitrile and the like for introducing nitrile; and acrolein, vinyl ethyl ketone and the like for introducing carbonyl.

Preferred as the resin (A) are the fluoroolefin resins (A1) having functional group from the viewpoint of excellent weather resistance.

The coating composition of the present invention substantially comprises the resin (A) and the stain-proofing component (B), and the curing agent (C) may be mixed thereto depending on a combination of the functional groups.

An adding amount of the stain-proofing component (B) is from 0.01 to 50 parts by weight based on 100 parts by weight of the resin (A) and a preferable lower limit is 0.1 part by weight. An upper limit thereof is preferably 20 parts by weight. When the amount of the stain-proofing component (B) is too large, a film forming property is lowered and weather resistance is also lowered. When the amount is too small, water- and oil-repellency tends to be lowered.

When the combination of the functional group X of the resin (A) and the functional group Y of the stain-proofing component (B) is hydroxyl and hydroxyl, hydroxyl and amino, carboxyl and carboxyl, carboxyl and amino, carboxyl and epoxy, amino and amino, or epoxy and epoxy, it is preferable to mix the curing agent (C). The curing agent may be used also in the case of a combination of hydroxyl and a hydrolyzable alkyl silicate residue.

A preferred curing agent (C) may be optionally selected depending on the combination of the functional groups X and Y.

Examples of the curing agent (C) is at least one selected from the group consisting of an amino compound, epoxy compound, organic acid, hydrazide compound, aziridine compound, carbodiimide compound and/or $Si(OR^4)_4$, in which $R^4$ is a non-fluorine-containing alkyl group having 1 to 10 carbon atoms, $R^5Si(OR^6)_3$, in which $R^5$ and $R^6$ are the same or different and each is a non-fluorine-containing alkyl group having 1 to 10 carbon atoms and solely condensed oligomers and co-condensed co-oligomers thereof.

An adding amount of the curing agent (C) may be optionally selected depending on kind of the curing agent, and is usually from 0 to 200 parts by weight based on 100 parts by weight of the sum of the resin (A) and the stain-proofing component (B). A preferred upper limit is 100 parts by weight, further 80 parts by weight, and a preferred lower limit is 5 parts by weight, further 10 parts by weight.

Mentioned below are combinations of the functional groups of the resin (A) and the stain-proofing component (B) and examples of the curing agent (C) suitable for the combinations. The present invention is not limited to them.

(1) When the functional group X of the resin (A) is hydroxyl and the functional group Y of the stain-proofing component (B) is hydroxyl or amino:

As the curing agent (C), isocyanate compounds are preferred.

The isocyanate compounds encompass blocked isocyanate compounds. Examples thereof are, for instance, 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, trimers thereof, adducts and biurets thereof, polymers thereof having at least two isocyanate groups, lysine triisocyanate (concretely 2-isocyanato-ethyl2,6-diisocyanatohexanoate and the like), blocked isocyanates and the like. The isocyanate compound and blocked isocyanate compound are not limited to them.

Also isocyanate compounds having hydrolyzable alkyl silicate residue can be used preferably.

Examples of the hydrolyzable alkyl silicate residue are preferably those explained in the resin (A).

Examples of the isocyanate compound having hydrolyzable alkyl silicate residue are, for instance, $OCNC_3H_6Si(OCH_3)_3$, $OCNC_3H_6Si(OC_2H_5)_3$, $OCNC_3H_6Si(OCOCH_3)_3$, $OCNC_3H_6Si(CH_3)(OCH_3)_3$ and the like.

A mixing ratio of the isocyanate compound to the resin (A) is preferably from 0.5 to 5.0, more preferably from 0.8 to 1.5 in NCO/OH (mole ratio). Also when the isocyanate is of moisture curing type, the mixing ratio is preferably from 1.1 to 1.5.

As the curing agent (C), there can be used at least one selected from the group consisting of $Si(OR^4)_4$, in which $R^4$ is a non-fluorine-containing alkyl group having 1 to 10 carbon atoms, $R^5Si(OR^6)_3$, in which $R^5$ and $R^6$ are the same or different and each is a non-fluorine-containing alkyl group having 1 to 10 carbon atoms and solely condensed oligomers and co-condensed co-oligomers thereof instead of or in addition to the isocyanate compound.

As those tetra-functional or tri-functional non-fluorine-containing alkyl silicates, there can be used those disclosed in U.S. Pat. No. 5,635,572, etc.

Concretely there are, for example, tetraalkoxysilane or condensates thereof, alkyltrialkoxysilane or condensates thereof, polysilseskioxane, colloidal silica and the like.

Examples of tetraalkoxysilane are tetramethoxysilane, tetraethoxysilane, tetrabutoxysilane, condensates thereof and the like. As the commercially available tetraalkoxysilane, there can be used MS51, MS56, MS57 and the like available from Mitsubishi Chemical Corporation and ETHYLSILICATE28, ETHYLSILICATE40, ETHYLSILICATE48 and the like available from Colcoat Co., Ltd.

Examples of the polysilseskioxane are polyphenylsilseskioxane, polymethylsilseskioxane, polyhydrogenesilseskioxane and the like.

As the colloidal silica, there can be used Snowtex available from Nissan Chemical Co., Ltd. and the like.

Among them, preferred are condensates of tetraalkoxysilane from the point that a crosslinking density is high and a rigid coating film can be formed.

An adding amount of such a silicate curing agent may be optionally selected depending on kind of the curing agent, and is usually from 0 to 100 parts by weight based on 100 parts by weight of the sum of the resin (A) and the stain-proofing component (B). A preferred upper limit is 50 parts by weight and a preferred lower limit is 10 parts by weight.

With respect to a synthetic resin having hydroxyl which is used in this combination, it is preferable that a hydroxyl value thereof is not less than 10 mgKOH/g, preferably not less than 50 mgKOH/g, from the point of increasing a crosslinking density and enhancing a strength of a coating film. An upper limit of the hydroxyl value is 300 mgKOH/g, preferably 200 mgKOH/g. When the hydroxyl value is too high, there is a case where a problem with flexibility of the coating film arises.

Further it is preferable that the synthetic resin having hydroxyl is a fluorine-containing resin having hydroxyl, and it is particularly preferable that the fluorine content thereof is not less than 10% by mass, further not less than 20% by mass, particularly not less than 30% by mass, from the point of enhancing stain-proofing property and weather resistance and decreasing a refractive index. An upper limit of the fluorine content is a fluorine content of a perfluoro-resin in which hydrogen atoms have been replaced with fluorine atoms.

Also it is particularly preferable that the functional group Y of the stain-proofing component (B) is amino from the viewpoint of good reactivity with the isocyanate compound used as the curing agent (C).

In this case, an amino equivalence of the stain-proofing component is not less than 1,000.

The amino equivalence is an index of the number of amino groups per 10,000 of a number average molecular weight and is represented by (10,000 of a number average molecular weight)/(number of amino groups per 10,000 of a number average molecular weight). Therefore as the amino equivalence increases, the number of amino groups is smaller in the case of compounds having the same molecular weight.

A preferred amino equivalence is not less than 1,500, particularly not less than 3,000. An upper limit thereof is 50,000, further 10,000. If the amino equivalence is too low (if the number of amino groups is too large), there is a case where a reaction with the isocyanate compound is preceded prior to a reaction with hydroxyl of the hydroxyl-containing synthetic resin, and the isocyanate compound and the stain-proofing component form a complex to be formed into particles, thereby lowering appearance of a coating film.

However if such large particles are removed by filtrating through a mesh having a pore size of 50 µm, appearance of a coating film is not lowered.

(2) When the functional group X of the resin (A) is carboxyl and the functional group Y of the stain-proofing component (B) is carboxyl, amino or epoxy:

As the curing agent (C), amino compounds, epoxy compounds, aziridine compounds and carbodiimide compounds are preferred.

Examples of the curing agent comprising an amino compound are, for instance, a melamine resin, urea resin, guanamine resin, amine adduct, polyamide and the like.

Examples of commercially available curing agent comprising an amino compound are Cymel available from Mitsui Cytec Co., Ltd., ANCAMIN and Epilink available from Air Products and chemicals, Inc., Versamin and Versamid available from Henchel, Tohmide and Fujicure available from Fuji Kasei Kogyo Co., Ltd., Versamid available from Dai-Ichi General Kabushiki Kaisha, Epicure available from Japan Epoxy Resins Co., Ltd., Sunmide available from Sanwa Chemical Co., Ltd., Epomate available from Ajinomoto Kabushiki Kaisha and the like.

Examples of the curing agent comprising an epoxy compound are, for instance, an epoxy resin, epoxy-modified silane coupling agent and the like. Examples of commercially available curing agent comprising an epoxy compound are Epikote and EPIREC available from Japan Epoxy Resins Co., Ltd., Cardolite available from Cardolite Corporation, CoatO-Sil 1770 and A-187 available from Nippon Unicar Company Limited and the like.

Examples of the curing agent comprising an aziridine compound are XAMA2 and XAMA7 available from BF-Goodrich Co., Ltd. and the like.

Examples of the curing agent comprising a carbodiimide compound are Carbodilite available from Nisshinbo Industries, Inc., UCARLNK Crosslinker XL-29SE available from Union Carbide Co., Ltd. and the like.

(3) When the functional group X of the resin (A) is amino and the functional group Y of the stain-proofing component (B) is amino or carboxyl:

As the curing agent (C), epoxy compounds and organic acids are preferred.

As the curing agent comprising an epoxy compound, there can be used those exemplified in (2) above.

Examples of the curing agent comprising an organic acid are, for instance, polycarboxylic acids such as phthalic anhydride, adipic acid and succinic acid, polyacrylic acid and the like.

(4) When the functional group X of the resin (A) is epoxy and the functional group Y of the stain-proofing component (B) is amino or epoxy:

As the curing agent (C), organic acids and amino compounds are preferred.

As the curing agent comprising an organic acid, there can be used those exemplified in (3) above.

As the curing agent comprising an amino compound, there can be used those exemplified in (2) above.

(5) When the functional group X of the resin (A) is carbonyl or carboxyl and the functional group Y of the stain-proofing component (B) is amino or carboxyl:

As the curing agent (C), epoxy compounds and hydrazide compounds are preferred.

Examples of the curing agent comprising a hydrazide compound are, for instance, malonic acid dihydrazide, glutaric acid dihydrazide, hydrazine, maleic acid dihydrazide, adipic acid dihydrazide and the like.

Among them, in consideration of reactivity and easiness of synthesis, a particularly preferred combination is that (1a) the functional group X of the resin (A) is hydroxyl, the functional group Y of the stain-proofing component (B) is amino and the curing agent (C) is an isocyanate compound, particularly an isocyanate curing agent having a hydrolyzable alkyl silicate residue.

In the present invention, the curing catalyst (D) may be used instead of or in addition to the curing agent (C).

Particularly when the resin (A) has a hydrolyzable alkyl silicate residue and the stain-proofing component (B) has hydroxyl or a hydrolyzable alkyl silicate residue, or when the resin (A) has hydroxyl and the stain-proofing component (B) has a hydrolyzable alkyl silicate residue, even if the curing agent (C) is not mixed, sufficient curing reaction arises between the functional group X of the resin (A) and the functional group Y of the stain-proofing component (B).

Examples of the curing catalyst (D) are, for instance, organotin compound, organic acidic phosphate, organotitanate compound, reaction product of acidic phosphate and amine, saturated or unsaturated polycarboxylic acid or its acid anhydride, organic sulfonic acid, amine compound, aluminum chelate compound, titanium chelate compound, zirconium chelate compound and the like.

Examples of the organotin compound are, for instance, dibutyltindilaurate, dibutyltinmaleate, dioctyltinmaleate, dibutyltindiacetate and the like.

Examples of the organic acidic phosphate are, for instance,

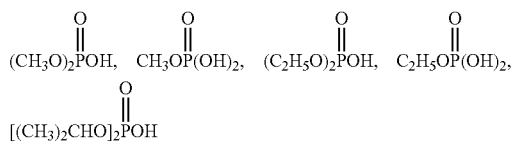

and the like.

Examples of the organotitanate compound are, for instance, titanates such as tetrabutyl titanate, tetraisopropyl titanate and triethanolamine titanate.

Further examples of the amine compound are, for instance, amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine or 1,8-diazabicyclo(5.4.0)undecene-7 (DBU) and salts thereof with carboxylic acid; low molecular weight polyamide resin obtained from excess polyamine and polybasic acid; reaction product of excess polyamine and epoxy compound; and the like.

Examples of the chelate compound are aluminum tris (ethylacetoacetate), aluminum tris(acetylacetonate), zirconium tetrakis(acetylacetonate), bis(ethylacetoacetate)titanium diisopropoxide and the like.

The curing catalyst (D) may be used alone or in combination of two or more. Preferable curing catalysts are an organotin compound and aluminum chelate compound. A mixing amount of the curing catalyst is from 0 to 10 parts by weight, preferably from 0.001 to 5 parts by weight based on 100 parts by weight of the sum of the resin (A), the stain-proofing component (B) and the curing agent (C).

In the present invention, an organic solvent can be mixed to the above-mentioned coating composition to make an organic solvent-based paint.

Examples of the organic solvent are, for instance, a hydrocarbon solvent such as xylene, toluene, Solvesso 100, Solvesso 150 or hexane; an ester solvent such as methyl acetate, ethyl acetate, butyl acetate, ethylene glycol monomethyl acetate, ethylene glycol monoethyl acetate, ethylene glycol monobutyl acetate, diethylene glycol monomethyl acetate, diethylene glycol monoethyl acetate, diethylene glycol monobutyl acetate, ethylene glycol acetate or diethylene glycol acetate; an ether solvent such as dimethyl ether, diethyl ether, dibutyl ether, ethylene glycol monomethyl ether, ethylene glycol monoethyl ether, ethylene glycol monobutyl ether, ethylene glycol dimethyl ether, ethylene glycol diethyl ether, ethylene glycol dibutyl ether, diethylene glycol monomethyl ether, diethylene glycol monoethyl ether, diethylene glycol monobutyl ether, diethylene glycol dimethyl ether, diethylene glycol diethyl ether, diethylene glycol dibutyl ether or tetrahydrofuran; ketone solvent such as methyl ethyl ketone, methyl isobutyl ketone or acetone; amide solvent such as N,N-dimethylacetamide, N-methylacetamide, acetamide, N,N-dimethylformamide, N,N-diethylformamide or N-methylformamide; sulfonic acid ester solvent such as dimethylsulfoxide; alcohol solvent such as methanol, ethanol, isopropanol, butanol, ethylene glycol, diethylene glycol, polyethylene glycol (degree of polymerization: 3 to 100), $CF_3CH_2OH$, $F(CF_2)_2CH_2OH$, $(CF_3)_2CHOH$, $F(CF_2)_3CH_2OH$, $F(CF_2)_2C_2H_5OH$, $H(CF_2)_2CH_2OH$, $H(CF_2)_3CH_2OH$ or $H(CF_2)_4CH_2OH$; and the like. From the viewpoint of compatibility, appearance of the coating film and storage stability, preferred are alcohol solvents such as lower alcohol and lower fluorine-containing alcohol.

With respect to a mixing amount of the resin (A) and the alcohol solvent, an amount of the alcohol solvent is from 1 to 50 parts by weight based on 100 parts by weight of the resin (A), preferably from 1 to 25 parts by weight from the viewpoint of curability and appearance of a coating film.

When the curing agent has high reactivity with alcohol like a room temperature curing type isocyanate, the amount of the alcohol solvent is further preferably from 1 to 15 parts by weight, and the preferred alcohol is a secondary or tertiary alcohol.

The solvent type coating composition of the present invention is excellent in solvent solubility, and a formed coating film has high weather resistance and is excellent in a stain-proofing property, particularly removability of oily stain (erasing of scribblings), chemical resistance, optical properties, mechanical properties, adhesion to substrates, resistance to yellowing due to heat, etc. Like usual curing compositions, the coating composition of the present invention can be applied as paints for indoor use for building materials and interior materials or for outdoor use for building materials, cars, air planes, ships, trains, etc., directly on metals, concrete, plastics or on a primer paint such as wash primer, rust preventive paint, epoxy resin paint, acrylic resin paint, polyester resin paint and urethane paint, and further can be used as a sealing agent and film forming agent.

The above-mentioned composition can be used in various manners, for example, in clear finish, in solid form and in blend with a filler.

Various coating methods can be employed, for example, spray coating, brush coating, roller coating, curtain flow and dip coating.

To the coating composition of the present invention can be added additives for paints, for example, pigment, pigment dispersing agent, thickener, leveling agent, anti-foaming agent, auxiliary for film forming, ultraviolet ray absorber, HALS, flatting agent, filler, colloidal silica, fungus preventing agent, silane coupling agent, anti-skinning agent, antioxidant, flame retardant, anti-drip agent, anti-static agent, rust preventing agent, water soluble resin (polyvinyl alcohol, polyethylene oxide, etc.), antiseptics, anti-freezing agent and the like.

Examples of the pigment are, for instance, titanium oxide, iron oxide, aluminum metallic pigment, carbon black, sintered pigment, phthalocyanine pigment, organic pigment, extended pigment and the like.

Examples of the suitable ultraviolet ray absorber are, for instance, those of benzophenone type and benzotriazole type. Among them, effective benzophenone type absorbers are 2,2'-dihydroxy-4,4'-dimethoxybenzophenone, 2,2'-dihydroxy-4,-methoxybenzophenone and 2,2',4,4'-tetrahydroxybenzophenone, and effective benzotriazole type absorbers are 2-(2'-hydroxy-5'-methylphenyl)benzotriazole, 2-(2'-hydroxy-5'-methylphenyl)-5,6-dichlorobenzotriazole, 2-(2'-hydroxy-5'-tert-butylphenyl)benzotriazole, 2-(2'-hydroxy-3', 5'-di-tert-butylphenyl)-5-chlorobenzotriazole, 2-(2'-hydroxy-5'-phenylphenyl)-5-chlorobenzotriazole, 2-(2'-hydroxy-3'-tert-butylphenyl)-5-chlorobenzotriazole, 2-(2'-hydroxy-3',5'-di-tert-butylphenyl)benzotriazole and 2-(2'-hydroxy-5'-tert-octylphenyl)benzotriazole.

Particularly suitable ultraviolet ray absorbers are those represented by the formula:

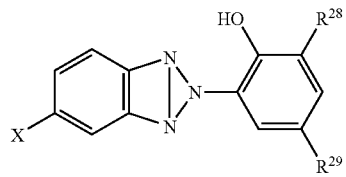

wherein $R^{28}$ and $R^{29}$ are the same or different, and each is hydrogen atom, a lower alkyl group, particularly a branched lower alkyl group or an aryl group, particularly phenyl, X is hydrogen atom or a halogen atom, particularly chlorine atom.

Examples of HALS are, for instance, Tinuvin-770, 292, 622123 and 440 available from Ciba Geigy Kabushiki Kaisha and the like.

Examples of the flatting agent are, for instance, Selidast #3620, #9615A, #9612A, #3715 and #3910, Hoechst Wax PE520 and white carbon which are available from Hoechst Industries Co., Ltd., and the like.

Examples of the silane coupling agent are, for instance, methyltrimethoxysilane, ethyltriethoxysilane, dimethyldimethoxysilane, trimethylmethoxysilane, vinyltrimethoxysilane, 3-(glycidyloxy)propyltrimethoxysilane, N-(2-aminoethyl)-3-aminopropyltrimethoxysilane, 3-aminopropyltrimethoxysilane, 3-aminopropyltriethoxysilane, 3-mercaptopropyltrimethoxysilane, 3-trimethoxysilylpropylisocyanate, 3-triethoxysilylpropylisocyanate, methyltris(ethylmethylketoxime)silane and the like. Preferred silane coupling agents are those having alkylketoxime group or isocyanate group.

As mentioned in the explanation of the fluorine-containing resin having functional group, the coating composition of the present invention can be made into not only an organic solvent-based paint but also an aqueous dispersion type paint by dispersing in an aqueous medium.

When the coating composition is used for an aqueous dispersion type paint, as mentioned above, the solid content thereof is from about 20% by weight to about 70% by weight, preferably from about 30% by weight to about 60% by weight from the viewpoint of excellent stability when making a paint. An average particle size is from about 50 nm to about 300 nm, preferably from about 100 nm to about 250 nm from the viewpoint of excellent stability of the aqueous dispersion. It is preferable that a pH value is usually within a range of from 5 to 10.

Also when making an aqueous dispersion type paint, it is preferable to use the curing agent (C) and curing catalyst (D) which are water soluble or water dispersible. The curing agent and curing catalyst are not limited to them.

Also in the case of the aqueous dispersion type paint, the above-mentioned various additives can be mixed. Further it is preferable to mix an auxiliary for film forming in order to enhance a film forming property. As the auxiliary for film forming, there can be used, for example, diethylene glycol monobutyl ether, diethylene glycol monobutyl ether acetate, diethyl adipate, dibutyl adipate and commercially available auxiliaries such as CS-12 available from Chisso Corporation and DBE and DBE-IB available from du Pont.

Also in order to impart dispersion stability of the aqueous dispersion, it is preferable that a surfactant is present. Non-limiting examples of the surfactant are, for instance, a fluorine-containing surfactant such as ammonium perfluorooctanoate or ammonium perfluorononanate; a nonionic non-fluorine-containing surfactant such as polyoxyethylene alkyl ether or sorbitan alkyl ester; an anionic non-fluorine-containing surfactant such as sodium alkyl sulfonate or sodium dialkyl sulfosuccinate; an ampholytic surfactant such as lauryl betaine or sodium sulfate of polyoxyethylene nonyl ether; and the like.

The coating composition of the present invention can be applied to various substrates irrespective of its form. Examples of the substrate are, for instance, those made of metal, cement, plastic, etc.

Examples of the metal substrate are, for instance, iron and chemically treated or plated iron, aluminum and chemically treated aluminum, stainless steel and chemically treated stainless steel and the like.

Examples of the cement substrate are, for instance, cement, lime, gypsum, concrete, cement mortar, asbestos slate, gypsum board and the like.

Examples of the plastic substrate are, for instance, polyvinyl chloride, polyester, polycarbonate, melamine, phenol, acryl, polyolefin, polystyrene, polyurethane, polyamide, nylon, natural rubber, urethane rubber, ABS resin and the like.

In the case of a metal substrate, it is preferable from the viewpoint of corrosion resistance and intercoat adhesion that the coating composition of the present invention is applied after under coating and intermediate coating as mentioned below. However particularly when applied directly on a substrate, the coating composition of the present invention exhibits a strong adhesion which has never been obtained.

As the under coat paint, a zinc rich paint is preferred.

Examples of a vehicle for organic zinc rich paint are, for instance, combination of epoxy resin-polyamide resin, chlorinated rubber, polystyrene resin, silicone resin, and the like. Examples of a vehicle for inorganic zinc rich paint are, for instance, ethyl silicate, sodium silicate, lithium silicate, potassium silicate, ammonium silicate and the like. The vehicles particularly preferred for the purposes of the present invention are combination of epoxy resin-polyamide resin, ethyl silicate, potassium silicate and lithium silicate.

Examples of other preferred under coat paints and intermediate coat paints are paints obtained by adding a usually employed coloring pigment, extended pigment, antisettling agent, dispersing agent, curing agent, curing accelerator, thinner, solvent, etc. to at least one synthetic resin selected from epoxy resin (including tar- or urethane-modified one), vinyl resin (including tar-modified resin and acrylic resin), chlorinated rubber, polyurethane resin and phenol resin, and then kneading.

The above-mentioned epoxy resin is a resin which has two or more epoxy groups in its molecule and is used usually for paints.

As the epoxy resin, there can be cited, for example, bisphenol epoxy resins such as commercially available Epikote 828, 834, 836, 1001, 1004 and DX-255 which are trade names of Shell Kagaku Kabushiki Kaisha, Araldite GY-260 which is trade name of Ciba Geigy, DER 330, 331 and 337 which are trade names of Dow Chemical and Epiclon 800 which is trade name of Dai Nippon Ink Kagaku Kogyo Kabushiki Kaisha; phenol-novolac epoxy resins such as commercially available DEN 431 and 438 which are trade names of Dow Chemical; polyglycol epoxy resins such as commercially available Araldite CT-508 which is trade name of Ciba Geigy and DER-732 and 736 which are trade names of Dow Chemical; ester epoxy resins such as Epiclon 200 and 400 which are trade names of Dai Nippon Ink Kagaku Kogyo Kabushiki Kaisha; and linear aliphatic epoxy resin such as an epoxidated polybutadiene like BF-1000 which is trade name of Nippon Soda Kabushiki Kaisha.

Epoxy compounds easily analogized from the above-mentioned epoxy resins and derivatives of the epoxy resins are also usable similarly and are encompassed within the technical scope of the present invention.

For example, polyol epoxy resin, alicyclic epoxy resin, halogen-containing epoxy resin and the like are encompassed therein.

To the epoxy resin can be mixed bituminous materials such as mineral bitumen, asphaltite, asphaltic pyrobitumen, tar, coal tar, artificial asphalt and pitch.

As the curing agent for the epoxy resin, there can be used those usually used for paints, such as amine adduct and polyamide resin.

As the curing agent, there are cited, for instance, polyamide resins such as commercially available Tohmide Y-25, 245, 2400 and 2500 which are trade names of Fuji Kasei Kogyo Co., Ltd., Zenamide 2000 and Versamide 115 and 125 which are trade names of Dai-ichi General Kabushiki Kaisha, Sunmide 320, 330 and X2000 which are trade names of Sanwa Kagaku Kabushiki Kaisha, and Epicure 3255 and 4255 which are trade names of Japan Epoxy Resins Co., Ltd.; amine adduct resins such as Tohmide 238 and Fujicure 202 which are trade names of Fuji Kagaku Kogyo Kabushiki Kaisha and Adeca Hardener EH-531 which is trade name of Asahi Denka Kabushiki Kaisha; aliphatic polyamines such as Sunmide T-100, D-100 and P-100 which are trade names of Sanwa Kagaku Kabushiki Kaisha; and heterocyclic diamine derivatives such as Epomate B-002, C-002 and S-005 available from Ajinomoto Kabushiki Kaisha.

An adding amount of the curing agent is about an equivalent to the epoxy resin, namely within the range of from about 0.7 to about 1.3 equivalents to 1 equivalent of the epoxy resin.

As the curing agent for the epoxy resin, polyisocyanate can also be used.

Examples of the vinyl resins used in the present invention are, for instance, copolymers comprising one or more of monomers such as vinyl chloride, vinylidene chloride, vinyl acetate, vinyl propionate, styrene, vinyltoluene, vinyl alcohol, acrylic acid, methacrylic acid, maleic anhydride, alkyl acrylate and alkyl methacrylate. Examples thereof are vinyl chloride resin, vinyl chloride-vinyl acetate copolymer resin, acrylic resin, and the like.

A chlorinated rubber resin used in the present invention is chlorinated natural rubber which is a compound containing usually 65 to 68% of chlorine.

The chlorinated rubber can be used in the mixture with rosin, coumarone-indene resin, phenol resin, vinyl chloride resin, petroleum resin, nitrile rubber, chloroprene rubber or alkyd resin.

The chlorinated rubber can also be used in the mixture with plasticizer such as chlorinated paraffin, diphenyl chloride, dioctyl phthalate or tricresyl phosphate.

The polyurethane resin used in the present invention is a composition comprising, as a main component, a compound having two or more active hydrogens in its molecule such as polyester polyol, polyether polyol, polyoxyalkylene glycol or acrylic polyol which is obtained from polybasic acid and polyol, and the above-mentioned curing agent, i.e. polyisocyanate having two or more isocyanate groups in its molecule.

When the substrate is the cement substrate, it is preferable that the coating composition of the present invention is applied on an under coating and intermediate coating as mentioned below.

As the under coat paint, it is particularly preferable to use multi-layer finish paints such as multi-layer finish paint of non-curable synthetic resin emulsion, multi-layer pattern finish paint of reaction-curable aqueous epoxy resin and multi-layer finish paint of reaction-curable solvent-based epoxy resin. The resin component of the non-curable synthetic resin emulsion includes, for example, acrylic resin, vinyl acetate resin and modified resins thereof. Also the curing system of the reaction-curable aqueous or solvent-based epoxy resin includes, for example, epoxy-polyamine, epoxy-polyamide, epoxy-polyamine-polyamide and the like.

The under coat paint on the cement substrate can be applied by, for example, spray coating method, roller coating method, etc. It appears that a sufficient applying amount is usually from 0.5 to 2.0 kg/m$^2$. In general, drying is carried out usually for 1 to 3 days.

Before applying the under coat paint to the cement substrate, known primer, surface sealer or the like which has been used in general for surface preparation for building can be applied previously. In addition to the above-mentioned under coat paint, the present invention includes direct coating of a sealer of solvent-based epoxy resin or coating of the sealer and then smooth-finishing with isocyanate curing resin paint, etc.

The coating composition of the present invention can be applied to the under coating film by, for example, roller coating method, brush coating method, spray coating method, etc. An applying amount is from 0.05 to 0.5 kg/m$^2$, preferably from 0.1 to 0.3 kg/m$^2$. A cured coating film can be formed by drying at room temperature for at least one day.

A repair coating method comprises applying the coating composition of the present invention after necessary surface preparation of the existing top coating film on the cement substrate for exterior of buildings.

In the above method, the existing top coating is not particularly limited. The particularly preferred top coating film is one formed by using paints as used for the composition of the present invention, i.e. a non-crosslinkable solvent-based paint such as curable fluorine-containing paint, curable acrylic paint, acrylic silicon paint, carbonyl-hydrazide curable aqueous paint or vinyl acetate-modified acrylic resin paint and a non-crosslinkable aqueous paint such as acrylic resin aqueous paint.

Examples of the carbonyl-hydrazide curable aqueous paint are ones prepared by mixing a water dispersion of a carbonyl-containing copolymer with a dihydrazide crosslinking agent and an aqueous polyurethane resin having hydrazine residue (for example, JP4-171683A). Between the existing top coating and the cement substrate may have been applied a primer and surfacer or thereon may have been applied multi-layer paints.

The surface preparation to be made, if occasion demands, on the existing top coating can be carried out, for example, by applying a surface treating agent mentioned below. Examples of the preferred surface treating agent are, for instance, a cement type filler or surfacer (for example, cement/synthetic resin emulsion, etc.), reaction-curable resin permeable sealer (for example, epoxy polyamine, epoxy polyamide, etc.), and the like.

The surface preparation can be carried out by applying the surface treating agent by means of, for example, roller, brush, etc. An applying amount of the surface treating agent is, for example, from 0.3 to 2.0 kg/m$^2$ in case of the filler, from 0.1 to 1.0 kg/m$^2$ in case of the surfacer and from 0.01 to 0.5 kg/m$^2$ in case of the permeable sealer.

After the application of the surface treating agent, a polyisocyanate curable solvent-based paint can be further applied by means of, for example, roller coating method, brush coating method or spray coating method. It is considered that a sufficient applying amount is from 0.05 to 0.5 kg/m$^2$. The drying of the surface treating agent and polyisocyanate curable solvent-based paint is usually carried out for 1 to 3 days. The application and drying of the coating composition of the present invention can be carried out in the same manner as mentioned above.

Also in case of the plastic substrate, the coating composition of the present invention can be applied after the application of the under coating and intermediate coating as used in the metal substrate and cement substrate.

Among the plastic substrates, in case of a plastic film and sheet, there are applying methods, for example, gravure roll coating, doctor blade coating, roll coating, reverse roll coating, air knife coating, curtain flow coating, etc. In those applying methods, a suitable coating thickness is from 1 to 20 μm, preferably from 1 to 10 μm from the viewpoint of appearance of a coating film and coatability.

Examples of uses of articles coated with the coating composition of the present invention are, for instance, water-proof sheet for building, water-proof sheet for tunnel, polyvinyl sheet for agriculture, polyvinyl film for agriculture, covering sheet, protection sheet for building, protection sheet for train, mesh sheet, mesh screen, polycarbonate roof, acryl board wall, polycarbonate wall, guardrail, traffic signal, inner wall of tunnel, inner plate for tunnel, road sign, guidance plate, side wall of highway, sound-isolation wall for highway, road light, bridge beam, bridge girder, bridge pier, chimney, steel sheet in combination of polyvinyl chloride and polyester, various wall papers (made of polyvinyl chloride, etc.), tatami-mat, floor mat, table cloth, decorative sheet coated with melamine resin, incombustible sheet coated with melamine resin, ventilation fan, marking film, geo-membrane, advertisement board, mail box, electric-light pole, tent, car, airplane, ship, train, computer housing, sheet for touch panel, anti-reflection sheet for monitor panel and the like.

Embodiments of preferable combinations of the components of the coating composition of the present invention are mentioned below. The present invention is not limited to them.

Embodiment 1

Resin (A): Fluoroolefin resin having hydroxyl
Stain-proofing component (B): Dialkylsiloxane having amino
Curing agent (C): Isocyanate having hydrolyzable alkyl silicate residue (and polyisocyanate, if occasion demands)
Curing catalyst (D): Dibutyltindilaurate (DBTDL) (option)
Form of paint: Organic solvent type or aqueous dispersio type Embodiment 2

Resin (A): Aqueous dispersion of composite resin obtained by seed-polymerizing an acrylic monomer having hydroxyl with fluoroolefin resin
Stain-proofing component (B): An aqueous dispersion of polydialkylsiloxane having amino
Curing agent (C): Polyisocyanate
Curing catalyst (D): Dibutyltindilaurate (DBTDL) (option)
Form of paint: Aqueous dispersion type

Embodiment 3

Resin (A): Fluoroolefin resin having hydroxyl
Stain-proofing component (B): Fluoropolyether having amino
Curing agent (C): Polyisocyanate
Curing catalyst (D): Dibutyltindilaurate (DBTDL) (option)
Form of paint: Organic solvent type or aqueous dispersion type

Embodiment 4

Resin (A): Fluoroolefin resin having hydroxyl
Stain-proofing component (B): Polydialkylsiloxane having hydroxyl
Curing agent (C): Polyisocyanate
Curing catalyst (D): Dibutyltindilaurate (DBTDL) (option)
Form of paint: Organic solvent type or aqueous dispersion type

Embodiment 5

Resin (A): Fluoroolefin resin having carboxyl
Stain-proofing component (B): Polydialkylsiloxane having carboxyl
Curing agent (C): Amino compound
Curing catalyst (D): Dibutyltindilaurate (DBTDL) (option)
Form of paint: Organic solvent type or aqueous dispersion type

Embodiment 6

Resin (A): Fluoroolefin resin having hydrolyzable alkyl silicate
Stain-proofing component (B): Polydialkylsiloxane having hydroxyl
Curing agent (C): None
Curing catalyst (D): Dibutyltindilaurate (DBTDL)
Form of paint: Organic solvent type or aqueous dispersion type

Embodiment 7

Resin (A): Seed polymer (composite resin) of fluoroolefin resin and acrylic resin having carboxyl
Stain-proofing component (B): Polydialkylsiloxane having amino
Curing agent (C): Epoxy compound
Curing catalyst (D): Dibutyltindilaurate (DBTDL) (option)
Form of paint: Aqueous dispersion type

Embodiment 8

Resin (A): Seed polymer (composite resin) of fluoroolefin resin and acrylic resin having carbonyl and carboxyl
Stain-proofing component (B): Polydialkylsiloxane having amino
Curing agent (C): Hydrazide compound
Curing catalyst (D): Dibutyltindilaurate (DBTDL) (option)
Form of paint: Aqueous dispersion type

Embodiment 9

Resin (A): Blend of fluoroolefin resin and non-fluorine-containing resin having hydroxyl
Stain-proofing component (B): Dialkylsiloxane having amino
Curing agent (C): Isocyanate having hydrolyzable alkyl silicate residue
Curing catalyst (D): Dibutyltindilaurate (DBTDL) (option)
Form of paint: Organic solvent type or aqueous dispersion type Then the present invention is explained by means of examples, but is not limited to them. "Part" in examples and preparation examples represents part by weight.

In the specification and claims of the present invention, the following values are measured by the respective methods explained below.

(Hydroxyl Value)
Measuring method: An absorption range of hydroxyl is measured with an infrared spectrophotometer and calculation is carried out using a calibration curve.

(Acid Value)
Measuring method: Measurement is carried out by a potentiometric titration method according to JIS K5407.

(Number Average Molecular Weight)
Measuring device: Measurement is carried out at 25° C. by gel permeation chromatography (GPC). A molecular weight is converted based on polystyrene as a reference material.
Column used: GMHXL column available from Toso Kabushiki Kaisha
Measuring conditions: 40° C., flow rate of 1 ml/min, THF as a developer (Fluorine Content)
Measuring method: Measurement is made by the elemental analysis explained below.

(Amino Equivalence)
As explained supra. The number of amino groups is measured by the following NMR.

(NMR)
Measuring device: AC-300 available from Bruker Biospin (Germany)
Measuring conditions: Proton is measured. Heavy acetone is used as a solvent.

(Elemental Analysis)
Measuring device: CHN CORDER available from Jay Science Kabushiki Kaisha and Ion Analyzer 901 available from Orion Research Kabushiki Kaisha.

(Glass Transition Temperature
Measuring device: Differential scanning calorimeter (DSC, RDC220 available from Seiko Denshi Kabushiki Kaisha)
Measuring conditions: A value at 2nd run is used at a temperature elevating rate of 20° C./min.

(Viscosity)
Measuring device: Brookfield type rotational viscometer available from Kabushiki Kaisha Tokyo Keiki
Measuring conditions: 60 rpm, 25° C.

(Refractive Index)
Measuring device: Abbe's refractometer
Measuring method: Measurement is made at 25° C. by a method using a film. A coating composition is applied on a polypropylene plate, followed by drying at 80° C. for two hours. A refractive index is measured using an obtained film.

EXAMPLE 1

To 100 parts of ZEFFLE GK-510 (tetrafluoroethylene copolymer having hydroxyl, hydroxyl value: 60 mgKOH/g, acid value: 9 mgKOH/g, number average molecular weight: 12,000, fluorine content: 36% by mass, refractive index of resin: 1.4, butyl acetate solution, solid content: 50%) were added 12 parts of CORONATE HX (isocyanate curing agent available from Nippon Polyurethane Co., Ltd.) as a curing agent, 2 parts of 1% butyl acetate solution of dibutyltindilaurate (DBTDL) as a curing catalyst and further 1 part of amino-containing silicone oil (amino-modified silicone oil NUC SILICONE FZ3705 available from Nippon Unicar Company Limited) and 50 parts of butyl acetate, followed by sufficiently stirring to obtain the coating composition of the present invention.

NUC SILICONE FZ3705 is an amino-containing dimethylsiloxane oligomer having a viscosity of 230 mm$^2$/s and an amino equivalence of 4,000.

This coating composition was applied on a flexible board made of slate (7×15×0.3 cm available from Nippon Test Panel Kabushiki Kaisha) by spray coating in a coating amount of 200 g/m$^2$, followed by drying at room temperature (about 25° C.) for one week to obtain a coated board.

With respect to this coated board, the following tests were carried out. The results are shown in Table 1.

Stain Removing Test Using Oily Ink:

Oily ink (Magic Ink, registered trademark of Kabushiki Kaisha Uchida Yoko) of red color available from Magic Kabushiki Kaisha is applied on the coated board. After allowing to stand for 24 hours, the ink is wiped with a dry paper towel, and evaluation is made as follows by a percentage of an area where the ink is left without being wiped off.

Also in order to determine an effect of an organic solvent (wiping test with acetone), the coated board is previously wiped ten times with a paper towel impregnated with acetone, followed by drying at room temperature for 5 minutes and then wiping with a dry paper towel. Evaluation is made as follows by a percentage of an area where the ink is left without being wiped off.
A: less than 5%
B: 5 to 15%
C: more than 15% and not more than 30%
D: more than 30%

Stain Removing Test Using Lacquer

Lacquer of red color available from Kansai Paint Kabushiki Kaisha is applied on the coated board by spray coating, followed by allowing to stand for 24 hours and then wiping with a dry paper towel. Evaluation is made as follows by a percentage of an area where the lacquer is left without being wiped off.
A: less than 5%
B: 5 to 15%
C: more than 15% and not more than 30%
D: more than 30%

Stain Removing Test Using Hairdye

A hairdye of black color: available from Shiseido Kabushiki Kaisha is applied on the coated board with a brush, followed by allowing to stand for 24 hours and then wiping with a dry paper towel. Evaluation is made as follows by a percentage of an area where the hairdye is left without being wiped off.
A: less than 5%
B: 5 to 15%
C: more than 15% and not more than 30%
D: more than 30%

Stain Removing Test Using Curry Soup

Packaged curry soup available from Otsuka Shokuhin Kabushiki Kaisha is applied on the coated board by knife-coating, followed by allowing to stand for 24 hours and then wiping with a dry paper towel. Evaluation is made as follows by a percentage of an area where the soup is left without being wiped off.
A: less than 5%
B: 5 to 15%
C: more than 15% and not more than 30%
D: more than 30%

Weather Resistance Test:

500-hour accelerated weather resistance test is carried out with a Sunshine Weather-o-meter available from Suga Test Instruments Co., Ltd. according to JIS K5400 and then the above-mentioned stain removing test using oily ink is carried out.

Adhesion Test:

A cross-cut adhesion test is carried out according to JIS K5400. With respect to a coated flexible board, a coated surface is cross-cut to give squares of 4 mm wide, and with respect to other coated board, a coated surface is cross-cut to give squares of 1 mm wide.

The cross-cut adhesion test is carried out by using a coated board after the application (initial adhesion) and a coated board which is dipped in hot water of 100° C. for two hours and then is taken out and cooled (adhesion after hot water resistance test).

In the adhesion test, as an article to be coated, there are used a flexible board and a natural granite (country of origin: China, available from Nittai Kogyo). The adhesion test is carried out also by using those articles which are coated with the coating composition by spray coating in a coating amount of 200 g/m$^2$ and are dried at room temperature for one week.

Clearness Test:

Clearness is evaluated by viewing a coated wooden plate having the grain and an un-coated wooden plate having the grain with naked eyes of ten persons apart five meters therefrom. When six or more persons judge that the coated plate is clearer than the un-coated plate, it is evaluated as good.

PREPARATION EXAMPLE 1

Preparation of fluoroolefin resin (A1) Having Hydrolyzable Alkyl Silicate Residue A 1,000 ml stainless steel autoclave was charged with 200 g of butyl acetate, 29.5 g of vinyltrimethoxysilane (TMVS), 20.0 g of n-butyl vinyl ether (nBVE) and 5.0 g of 2,2'-azobis (2,4-dimethylvaleronitrile), and after cooling to 0° C. with ice, was subjected to deaeration under reduced pressure. Thereto were added 33.5 g of isobutylene (IB) and g of tetrafluoroethylene (TFE) and the mixture was heated to 50° C. with stirring and reacted for 28 hours. When the pressure inside a reactor was lowered from 1.4 MPaG to 1 MPaG, the reaction was terminated (yield: 24.6%). As a result of $^{19}$F-NMR, $^1$H-NMR and elemental analyses, the obtained fluorine-containing copolymer having hydrolyzable alkyl silicate residue was a copolymer comprising TFE/IB/nBVE/TMVS in a % by mole ratio of 45/40/8/7. An acid value thereof was zero and the fluorine content was 40% by mass. A number average molecular weight was 3,900 according to GPC and a glass transition temperature measured by DSC was −21° C.

EXAMPLES 2 TO 8

Coating compositions were prepared in the same manner as in Example 1 except that the resin (A), stain-proofing component (B), curing agent (C) and curing catalyst (D) shown in Table 1 were used in amounts shown in Table 1, and coated boards for the tests were produced in the same manner as in Example 1. In Example 7, drying of a coating film was carried out at 120° C. for 20 minutes.

With respect to the obtained coated boards, tests and evaluation were carried out in the same manner as in Example 1. The results are shown in Table 1.

COMPARATIVE EXAMPLE 1

To 100 parts of ZEFFLE GK-510 were added 12 parts of CORONATE HX as a curing agent and 2 parts of DBTDL as a curing catalyst, followed by sufficiently stirring to obtain a coating composition for comparison.

This coating composition was applied on a flexible board (7×15×0.3 cm) by spray coating in a coating amount of 200 g/m² and dried at room temperature for one week to obtain a coated board.

With respect to this coated board, the same tests as in Example 1 were carried out. The results are shown in Table 1.

COMPARATIVE EXAMPLE 2

To 100 parts of ZEFFLE GK-510 were added 12 parts of CORONATE HX as a curing agent and 1 part of dimethyl silicone oil having no functional group (KF-96-100 available from Shin-Etsu Chemical Co., Ltd., viscosity: 100 mm²/s), followed by sufficiently stirring to obtain a coating composition for comparison.

This coating composition was applied on a flexible board (7×15×0.3 cm) by spray coating in a coating amount of 200 g/m² and dried at room temperature for one week to obtain a coated board.

With respect to this coated board, the same tests as in Example 1 were carried out. The results are shown in Table 1.

Each component in Table 1 is as follows.

Synthetic Resin 1:
ZEFFLE GK-510 (tetrafluoroethylene copolymer having hydroxyl, hydroxyl value: 60 mgKOH/g, acid value: 9 mgKOH/g, number average molecular weight: 12,000, fluorine content: 36% by mass, refractive index of resin: 1.4, butyl acetate solution, solid content: 50%)

Synthetic Resin 2:
ZEFFLE GK-550 (tetrafluoroethylene copolymer having hydroxyl, hydroxyl value: 95 mgKOH/g, no acid value, number average molecular weight: 10,000, fluorine content: 36% by mass, refractive index of resin: 1.4, butyl acetate solution, solid content: 60%)

Synthetic Resin 3:
Fluoroolefin resin having hydrolyzable alkyl silicate residue and prepared in Preparation Example 1 (TFE/IB/nBVE/TMVS copolymer, no acid value, number average molecular weight: 3,900, fluorine content: 40% by mass, refractive index of resin: 1.4)

Synthetic Resin 4:
Butyl acetate solution of t-butylmethacrylate/hydroxyethyl methacrylate (% by mole ratio of 90/10) copolymer (hydroxyl value: 40 mgKOH/g, no acid value, number average molecular weight: 10,000), solid content: 50%

Synthetic Resin 5:
Unsaturated polyester resin having hydroxyl (Phtalkyd 926-70 available from Hitachi Chemical Co., Ltd., hydroxyl value: 160 mgKOH/g, acid value: 11 mgKOH/g, butyl acetate solution, solid content: 50%)

Stain-Proofing Component 1:
Amino-containing silicone oil (NUC SILICONE FZ3705, amino-modified silicone oil available from Nippon Unicar Company Limited, viscosity: 230 mm²/s, amino equivalence: 4,000)

Stain-Proofing Component 2:
Silicone oil having hydroxyl (KF-6001 available from Shin-Etsu Chemical Co., Ltd., viscosity: 45 mm²/s, hydroxyl value: 62 mgKOH/g)

Stain-Proofing Component 3:
$F(C_3F_6O)_{12}CF_2CF_2CH_2NH_2$ (amino equivalence: 2,100)

Stain-Proofing Component 4:
Dimethyl silicone oil having no functional group (KF-96-100 available from Shin-Etsu Chemical Co., Ltd., viscosity: 100 mm²/s)

Curing Agent 1:
CORONATE HX (isocyanate curing agent available from Nippon Polyurethane Co., Ltd.)

Curing Agent 2:
$OCN-C_3H_6Si(OCH_3)_3$

Curing Catalyst:
1% butyl acetate solution of dibutyltindilaurate (DBTDL)

TABLE 1

|  | Example |  |  |  |  |
|---|---|---|---|---|---|
|  | 1 | 2 | 3 | 4 | 5 |
| Synthetic resin (A) | | | | | |
| Synthetic resin 1 | 100 | | | 100 | 100 |
| Synthetic resin 2 | | 100 | | | |
| Synthetic resin 3 | | | 100 | | |
| Synthetic resin 4 | | | | | |
| Synthetic resin 5 | | | | | |
| Stain-proofing component (B) | | | | | |
| Stain-proofing component 1 | 1 | 1 | | 1 | |
| Stain-proofing component 2 | | | 1 | | 1 |
| Stain-proofing component 3 | | | | | |
| Stain-proofing component 4 | | | | | |
| Curing agent (C) | | | | | |
| Curing agent 1 | 12 | 20 | | 12 | 12 |
| Curing agent 2 | | | | 5 | 5 |
| Curing catalyst (1% DBTDL) | 2 | 2 | 2 | 2 | 2 |

|  | Example |  |  | Com. Ex. |  |
|---|---|---|---|---|---|
|  | 6 | 7 | 8 | 1 | 2 |
| Synthetic resin (A) | | | | | |
| Synthetic resin 1 | 70 | | 100 | 100 | 100 |
| Synthetic resin 2 | | | | | |
| Synthetic resin 3 | | | | | |

TABLE 1-continued

| | | | | | |
|---|---|---|---|---|---|
| Synthetic resin 4 | 30 | | | | |
| Synthetic resin 5 | | | 100 | | |
| Stain-proofing component (B) | | | | | |
| Stain-proofing component 1 | 1 | | 1 | | |
| Stain-proofing component 2 | | | | | |
| Stain-proofing component 3 | | 1 | | | |
| Stain-proofing component 4 | | | | | 1 |
| Curing agent (C) | | | | | |
| Curing agent 1 | 12 | 12 | 40 | 12 | 12 |
| Curing agent 2 | | | | | |
| Curing catalyst (1% DBTDL) | 2 | 2 | 2 | 2 | 2 |

| | Example | | | | |
|---|---|---|---|---|---|
| | 1 | 2 | 3 | 4 | 5 |
| Stain removing test using oily ink | A | A | B | A | B |
| After wiping with acetone | A | A | B | A | B |
| Lacquer spray | A | A | A | A | A |
| Hairdye | A | A | A | A | A |
| Curry soup | A | A | A | A | A |
| Weather resistance after 500-hour test | A | A | A | A | A |
| Adhesion | | | | | |
| Flexible board | | | | | |
| Initial adhesion | 100/100 | 100/100 | 100/100 | 100/100 | 100/100 |
| Adhesion after hot water resistance test | 100/100 | 100/100 | 100/100 | 100/100 | 100/100 |
| Granite | | | | | |
| Initial adhesion | 100/100 | 100/100 | 100/100 | 100/100 | 100/100 |
| Adhesion after hot water resistance test | 60/100 | 70/100 | 100/100 | 100/100 | 100/100 |

| | Example | | | Com. Ex. | |
|---|---|---|---|---|---|
| | 6 | 7 | 8 | 1 | 2 |
| Stain removing test using oily ink | A | A | B | D | C |
| After wiping with acetone | A | A | B | D | D |
| Lacquer spray | A | A | B | D | C |
| Hairdye | A | A | B | A | A |
| Curry soup | A | A | A | B | B |
| Weather resistance after 500-hour test | A | A | D | D | D |
| Adhesion | | | | | |
| Flexible board | | | | | |
| Initial adhesion | 100/100 | 100/100 | 100/100 | 100/100 | 100/100 |
| Adhesion after hot water resistance test | 100/100 | 100/100 | 100/100 | 100/100 | 100/100 |
| Granite | | | | | |
| Initial adhesion | 100/100 | 100/100 | 100/100 | 100/100 | 100/100 |
| Adhesion after hot water resistance test | 70/100 | 60/100 | 70/100 | 0/100 | 0/100 |

PREPARATION EXAMPLE 2

(1) A 1-liter pressure resistant reactor equipped with a stirrer was charged with 500 ml of deionized water and 0.5 g of ammonium perfluorooctanoate, followed by repeating introduction of pressurized nitrogen gas and deaeration. After removing dissolved oxygen, the pressure inside the reactor was increased at 60° C. to 0.79 MPaG with a monomer mixture of VdF/TFE/CTFE (74/14/12% by mole). Thereto were added 20 g of 1% aqueous solution of ammonium persulfate and 1.5 g of ethyl acetate to initiate polymerization. The monomer mixture of VdF/TFE/CTFE (74/14/12% by mole) was continuously introduced so that the pressure inside the polymerization vessel became constant at 0.79 MPaG, and the reaction was continued. Every 12 hours, 5 g of 1% aqueous solution of ammonium persulfate was added during the reaction. 45 Hours after initiating the polymerization, the inside of the polymerization vessel was turned to ordinary temperature and ordinary pressure and the polymerization was terminated to obtain an aqueous dispersion of fluorine-containing polymer particles (solid content: 41%). An average particle size of the particles in this aqueous dispersion measured with a laser beam scattering particle size meter (DLS-3000 available from Otsuka Denshi Kabushiki Kaisha) was 0.12 μm.

(2) Next, a 2-liter four-necked flask equipped with a stirrer, thermometer and reflux tube was charged with 700 parts of VdF copolymer dispersion obtained in (1) above, 5.7 parts of an aqueous solution of sodium alkyl sulfosuccinate (available from Kao Corporation, RHEODOL OT-P, content of non-volatile substance: 70%), 140.0 parts of methyl methacrylate (MMA), 115.4 parts of n-butyl acrylate (BA), 5.6 parts of acrylic acid (AAc) and 19.0 parts of hydroxypropyl methacrylate (HPMA) and was heated to 80° C. After that, thereto was added 0.21 part of 10% aqueous solution of ammonium persulfate and after polymerizing at 80° to 85° C. for four hours, the flask was cooled to terminate the reaction. Then ion-exchanged water was added and a pH value was adjusted to 8.5 with ammonium water to obtain an aqueous dispersion of hydroxyl-containing fluoroolefin resin particles (seed polymer, hydroxyl value: 15 mgKOH/g, fluorine content: 30% by mass) having a solid content of 50%.

PREPARATION EXAMPLE 3

A 2-liter four-necked flask equipped with a stirrer, thermometer and reflux tube was charged with 700 parts of VdF copolymer dispersion obtained in (1) of Preparation Example 2, 5.7 parts of an aqueous solution of sodium alkyl sulfosuccinate (available from Kao Corporation, RHEODOL OT-P, content of non-volatile substance: 70%), 110.5 parts of methyl methacrylate (MMA), 143.3 parts of n-butyl acrylate (BA), 5.6 parts of acrylic acid (AAc) and 20.6 parts of γ-propoxytrimethoxysilyl methacrylate and was heated to 80° C. After that, thereto was added 0.21 part of 10% aqueous solution of ammonium persulfate and after polymerizing at 80° to 85° C. for four hours, the flask was cooled to terminate the reaction. Then ion-exchanged water was added and a pH value was adjusted to 8.5 with ammonium water to obtain an aqueous dispersion of fluoroolefin resin particles having hydrolyzable propyl silicate residue (seed polymer, fluorine content: 30% by mass) which had a solid content of 50%.

PREPARATION EXAMPLE 4

A stainless steel autoclave equipped with a stirrer was charged with 48.2 parts of ethyl vinyl ether (EVE), 140.5 parts of cyclohexyl vinyl ether (CHVE), 51.7 parts of hydroxyethyl vinyl ether (HEVE), 2.1 parts of monomer (EOVE) having a hydrophilic moiety, 100 parts of ion-exchanged water, 9 parts of emulsifying agent (N-1110 available from Nippon Nyukazai Kabushiki Kaisha), 0.9 part of emulsifying agent (SLS available from Nikko Chemical Kabushiki Kaisha), 1.8 parts of potassium carbonate ($K_2CO_3$) and 16.7 parts of 3% aqueous solution of ammonium persulfate (APS), followed by cooling with ice and deairing with pressurized nitrogen gas so that the inside of the autoclave became 0.35 MPaG. After repeating the pressurizing and deairing steps two times, the inside pressure was decreased to 10 mmHg to remove dissolved oxygen and 259.6 parts of chlorotrifluoroethylene (CTFE) was introduced. A reaction was continued at 30° C. for 12 hours to obtain a milky white aqueous dispersion of CTFE copolymer particles (hydroxyl value: 65 mgKOH/g, fluorine content: 25% by mass).

EOVE is a compound represented by $CH_2=CHOCH_2CH_2CH_2CH_2O(CH_2CH_2O)_nH$ (a mixture of the compound having n of 3 and the compound having n of 4).

PREPARATION EXAMPLE 5

To 54 g of deionized water were poured 40 g of amino-modified silicone oil (NUC SILICONE FZ3705 available from Nippon Unicar Company Limited, amino equivalence: 4,000) and 6 g of polyoxyethylene lauryl ether (EMULGEN 130K available from Kao Corporation), followed by sufficiently stirring mechanically to obtain a stable white emulsion.

PREPARATION EXAMPLE 6

To 54 g of deionized water were poured 40 g of carbinol-modified silicone oil (having hydroxyl) (KF-6001 available from Shin-Etsu Chemical Co., Ltd.) and 6 g of polyoxyethylene lauryl ether (EMULGEN 130K available from Kao Corporation), followed by sufficiently stirring mechanically to obtain a stable white emulsion.

PREPARATION EXAMPLE 7

A 2-liter four-necked flask equipped with a stirrer, thermometer and reflux tube was charged with 500 parts of VdF copolymer dispersion obtained in (1) of Preparation Example 2, 5.7 parts of an aqueous solution of sodium alkyl sulfosuccinate (available from Kao Corporation, RHEODOL OT-P, content of non-volatile substance: 70%), 140 parts of methyl methacrylate (MMA), 42 parts of n-butyl acrylate (BA) and 20 parts of acrylic acid (AAc) and was heated to 80° C. After that, thereto was added 0.15 part of 10% aqueous solution of ammonium persulfate and after polymerizing at 80° to 85° C. for four hours, the flask was cooled to terminate the reaction. Then ion-exchanged water was added and a pH value was adjusted to 8.5 with ammonium water to obtain an aqueous dispersion of carboxyl-containing fluoroolefin resin particles (seed polymer, fluorine content: 30% by mass) having a solid content of 50%.

PREPARATION EXAMPLE 8

A 2-liter four-necked flask equipped with a stirrer, thermometer and reflux tube was charged with 500 parts of VdF copolymer dispersion obtained in (1) of Preparation Example 2, 5.7 parts of an aqueous solution of sodium alkyl sulfosuccinate (available from Kao Corporation, RHEODOL OT-P, content of non-volatile substance: 70%), 233 parts of methyl methacrylate (MMA), 177 parts of n-butyl acrylate (BA), 9 parts of acrylic acid (AAc) and 10 parts of diacetone acrylamide and was heated to 80° C. After that, thereto was added 0.3 part of 10% aqueous solution of ammonium persulfate and after polymerizing at 80° to 85° C. for four hours, the flask was cooled to terminate the reaction. Then ion-exchanged water was added and a pH value was adjusted to 8.5 with ammonium water to obtain an aqueous dispersion of fluoroolefin resin particles having carbonyl and carboxyl (seed polymer, fluorine content: 20% by mass) which had a solid content of 50%.

EXAMPLE 9

To 100 parts of the aqueous dispersion of hydroxyl-containing fluoroolefin resin prepared in Preparation Example 2 were added 1 part of the emulsified amino-modified silicone oil prepared in Preparation Example 5, 3 parts of water-soluble isocyanate curing agent (Bayhydur 3100 available from Sumitomo Bayer Uurethane Kabushiki Kaisha) as a curing agent and 5 parts of film forming auxiliary (CS-12 available from Chisso Corporation), followed by sufficiently stirring to obtain an aqueous dispersion type coating composition.

This coating composition was applied on a flexible board (7×15×0.3 cm) by dip coating in a coating amount of 200 g/m² and dried at room temperature for one week to obtain a coated board.

With respect to this coated board, the same tests as in Example 1 were carried out. In the stain removing test using oily ink, ethanol was used instead of acetone for wiping (wiping with ethanol). The results are shown in Table 2.

EXAMPLES 10 TO 15

Coating compositions were prepared in the same manner as in Example 9 except that as the resin (A), stain-proofing component (B), curing agent (C) and curing catalyst (D), those shown in Table 2 were used in amounts shown in Table 2, and coated boards for the tests were produced in the same manner as in Example 9. In Example 10, drying of a coating film was carried out at 120° C. for 20 minutes.

With respect to the obtained coated boards, tests and evaluation were carried out in the same manner as in Example 1. The results are shown in Table 2.

COMPARATIVE EXAMPLE 3

A coating composition for comparison was prepared in the same manner as in Example 9 except that a stain-proofing component was not used.

This coating composition was applied on a flexible board (7×15×0.3 cm) by dip coating in a coating amount of 200 g/m² and dried at room temperature for one week to obtain a coated board.

With respect to this coated board, the same tests as in Example 1 were carried out. The results are shown in Table 2.

Each component in Table 2 is as follows.

Synthetic Resin 6:
　Aqueous dispersion of VdF seed polymer having hydroxyl and prepared in Preparation Example 2 (hydroxyl value: 15 mgKOH/g, fluorine content: 30% by mass)

Synthetic Resin 7:
　Aqueous dispersion of VdF seed polymer having hydrolyzable alkyl silicate residue and prepared in Preparation Example 3 (fluorine content: 30% by mass)

Synthetic Resin 8:
　Aqueous dispersion of CTFE polymer having hydroxyl and prepared in Preparation Example 4 (hydroxyl value: 65 mgKOH/g, fluorine content: 25% by mass)

Synthetic Resin 9:
　Urethane emulsion (Daotan VTW1227/40WA available from Clariant Japan Kabushiki Kaisha, solid content: 40%, hydroxyl value: 50 mgKOH/g)

Synthetic Resin 10:
　Fluoroolefin resin having carboxyl and prepared in Preparation Example 7 (fluorine content: 30% by mass)

Synthetic Resin 11:
　Fluoroolefin resin having carbonyl and carboxyl and prepared in Preparation Example 8 (fluorine content: 20% by mass)

Stain-Proofing Component 5:
　Emulsion of amino-modified silicone oil (amino equivalence: 4,000) prepared in Preparation Example 5

Stain-Proofing Component 6:
　Emulsion of hydroxyl-containing (carbinol-modified) silicone oil prepared in Preparation Example 6

Curing Agent 3:
　Water-dispersion type isocyanate curing agent (Bayhydur 3100 available from Sumitomo Bayer Urethane Kabushiki Kaisha)

Curing Agent 4:
　Amino resin (Cymel 303 available from Mitsui Cytec Kabushiki Kaisha)

Curing Agent 5:
　Epoxy compound curing agent (CoatOSil 1770 available from Nippon Unicar Company Limited)

Curing Agent 6:
　5% aqueous solution of dihydrazide adipate

Auxiliary for Film Forming:
　Auxiliary for film forming (CS-12 available from Chisso Corporation)

Curing Catalyst:
　1% dibutyltindilaurate

TABLE 2

| | Example 9 | Example 10 | Example 11 | Example 12 |
|---|---|---|---|---|
| Synthetic resin (A) | | | | |
| Synthetic resin 6 | 100 | 100 | | |
| Synthetic resin 7 | | | 100 | |
| Synthetic resin 8 | | | | 100 |
| Synthetic resin 9 | | | | |
| Synthetic resin 10 | | | | |
| Synthetic resin 11 | | | | |
| Stain-proofing component (B) | | | | |
| Stain-proofing component 5 | 1 | 1 | | 1 |
| Stain-proofing component 6 | | | 1 | |
| Curing agent (C) | | | | |
| Curing agent 3 | 3 | | | 3 |
| Curing agent 4 | | 10 | | |
| Curing agent 5 | | | | |
| Curing agent 6 | | | | 5 |
| Auxiliary for film forming | 5 | 5 | 5 | 5 |
| Curing catalyst | | | 4 | |

| | Example 13 | Example 14 | Example 15 | Com. Ex. 3 |
|---|---|---|---|---|
| Synthetic resin (A) | | | | |
| Synthetic resin 6 | | | | 100 |
| Synthetic resin 7 | | | | |
| Synthetic resin 8 | | | | |
| Synthetic resin 9 | 100 | | | |
| Synthetic resin 10 | | 100 | | |
| Synthetic resin 11 | | | 100 | |
| Stain-proofing component (B) | | | | |
| Stain-proofing component 5 | 1 | 1 | 1 | |
| Stain-proofing component 6 | | | | |
| Curing agent (C) | | | | |
| Curing agent 3 | 20 | | | 3 |
| Curing agent 4 | | | | |
| Curing agent 5 | | 5 | 35 | |
| Curing agent 6 | | | | |
| Auxiliary for film forming | 5 | 5 | 5 | 5 |
| Curing catalyst | | 0.5 | | |

| | Example 9 | Example 10 | Example 11 | Example 12 |
|---|---|---|---|---|
| Stain removing test using oily ink | A | A | B | B |
| After wiping with ethanol | A | A | A | A |
| Lacquer spray | A | A | A | A |
| Hairdye | A | A | A | A |
| Curry soup | A | A | A | A |
| Weather resistance after 500-hour test Adhesion | A | A | A | A |

TABLE 2-continued

Flexible board

| | | | | |
|---|---|---|---|---|
| Initial adhesion | 100/100 | 100/100 | 100/100 | 100/100 |
| Adhesion after hot water resistance test | 100/100 | 100/100 | 100/100 | 100/100 |

Granite

| | | | | |
|---|---|---|---|---|
| Initial adhesion | 100/100 | 100/100 | 100/100 | 100/100 |
| Adhesion after hot water resistance test | 60/100 | 70/100 | 100/100 | 70/100 |

| | Example | | | Com. Ex |
|---|---|---|---|---|
| | 13 | 14 | 15 | 3 |
| Stain removing test using oily ink | B | A | A | D |
| After wiping with ethanol | A | A | A | B |
| Lacquer spray | A | A | A | D |
| Hairdye | A | A | A | A |
| Curry soup | A | A | A | C |
| Weather resistance after 500-hour test | D | A | A | A |

Adhesion
Flexible board

| | | | | |
|---|---|---|---|---|
| Initial adhesion | 100/100 | 100/100 | 100/100 | 100/100 |
| Adhesion after hot water resistance test | 100/100 | 100/100 | 100/100 | 100/100 |

Granite

| | | | | |
|---|---|---|---|---|
| Initial adhesion | 100/100 | 100/100 | 100/100 | 100/100 |
| Adhesion after hot water resistance test | 90/100 | 60/100 | 70/100 | 0/100 |

PREPARATION EXAMPLE 9

A 1,000 ml stainless steel autoclave was charged with 300 g of butyl acetate, 20 g of hydroxybutyl vinyl ether (HBVE), 96 g of cyclohexyl vinyl ether (CHVE) and 5.0 g of 2,2'-azobis(2,4-dimethylvaleronitrile), and after cooling to 0° C. with ice, deairing was carried out under reduced pressure. Thereto were added 34 g of isobutylene (IB) and 50 g of tetrafluoroethylene (TFE), followed by heating to 50° C. with stirring and then reacting for 28 hours. When the pressure inside a reactor was lowered from 1.4 MPaG to 1 MPaG, the reaction was terminated (yield: 24.6%). Then concentration was carried out at 60° C. under reduced pressure to adjust a solid content to 50%.

As a result of $^{19}$F-NMR, $^1$H-NMR and elemental analyses, the obtained fluorine-containing copolymer was a copolymer comprising TFE/IB/CHVE/HBVE in a % by mole ratio of 20/30/40/10. A hydroxyl value was 59 mgKOH/g and an acid value thereof was zero. The fluorine content was 15% by mass. A number average molecular weight measured by GPC was 7,000.

EXAMPLE 16

A coating composition was prepared in the same manner as in Example 9 except that the aqueous dispersion of fluorine-containing copolymer of Preparation Example 9 was used as the resin (A), and the stain-proofing component (B), curing agent (C) and curing catalyst (D) shown in Table 3 were used in amounts shown in Table 3.

This coating composition was applied on an aluminum board (7×15×0.3 cm) by spray coating in a coating amount of 200 g/m$^2$ and dried at room temperature (about 25° C.) for one week to obtain a coated board.

With respect to the obtained coated board, tests and evaluation were carried out in the same manner as in Example 1, and further pencil hardness was measured. The results are shown in Table 3.

(Pencil Hardness)

Measured according to JIS K5400.

EXAMPLES 17 TO 18

Coating compositions were prepared in the same manner as in Example 16 except that the resin (A), stain-proofing component (B), curing agent (C) and curing catalyst (D) shown in Table 3 were used in amounts shown in Table 3, and coated boards for tests were produced in the same manner as in Example 16.

With respect to the obtained coated boards, tests and evaluation were carried out in the same manner as in Example 1, and further pencil hardness was measured. The results are shown in Table 3.

Synthetic resin 12, Curing agent 7 and Curing agent 8 in Table 3 are as follows.

Synthetic resin 12:

Aqueous dispersion of fluorine-containing copolymer having hydroxyl and prepared in Preparation Example 9 (hydroxyl value: 59 mgKOH/g, fluorine content: 15% by mass)

Curing Agent 7:

Lysine triisocyanate, LTI (trade name) available from Kyowa Hakko Kogyo Co., Ltd.

Curing Agent 8:

Condensate of tetramethoxysilane, METHYLSILICATE 51 (trade name) available from Mitsubishi Chemical Corporation

TABLE 3

| | Example | | |
|---|---|---|---|
| | 16 | 17 | 18 |
| Synthetic resin (A) | | | |
| Synthetic resin 2 | | 100 | 100 |
| Synthetic resin 12 | 100 | | |
| Stain-proofing component (B) | | | |
| Stain-proofing component 1 | 1 | 0.2 | 0.2 |
| Curing agent (C) | | | |
| Curing agent 1 | 12 | | |
| Curing agent 7 | | 10 | 10 |
| Curing agent 8 | | | 1 |
| Curing catalyst (D) | | | |
| 1% DBTDL | 2 | 2 | 2 |
| Substrate | Al | Melamine | Melamine |
| Stain removing test using oily ink | B | A | A |
| After wiping with acetone | B | A | A |
| Lacquer spray | A | A | A |
| Hairdye | B | A | A |
| Curry soup | A | A | A |
| Weather resistance after 500-hour test | B | A | A |
| Adhesion | | | |
| Initial adhesion | 100/100 | 100/100 | 100/100 |
| Adhesion after water resistance test | 60/100 | 100/100 | 100/100 |
| Pencil hardness | F | F | H |
| Clearness | Good | Good | Good |

EXAMPLE 19

A coating composition was prepared in the same manner as in Example 16 except that the resin (A), stain-proofing component (B) and curing agent (C) shown in Table 4 were used in amounts shown in Table 4.

This coating composition was applied on a soft polyvinyl chloride plate (7×15×0.3 cm), which had been previously subjected to under-coating (ELUVACITE 2041, acrylic resin available from Lucite International Kabushiki Kaisha), by spray coating in a coating amount of 200 g/m² and dried at room temperature (about 25° C.) for one week to obtain a coated plate.

With respect to the obtained coated plate, tests were carried out in the same manner as in Example 1 and further pencil hardness was measured. The result's are shown in Table 4.

EXAMPLES 20 TO 22

Coating compositions were prepared in the same manner as in Example 16 except that the resin (A), stain-proofing component (B), curing agent (C) and curing catalyst (D) shown in Table 4 were used in amounts shown in Table 4, and coated plates for tests were produced in the same manner as in Example 19.

With respect to the obtained coated plates, tests were carried out in the same manner as in Example 1, and further pencil hardness was measured. The results are shown in Table 4.

EXAMPLE 23

A coating composition was prepared in the same manner as in Example 16 except that the resin (A), stain-proofing component (B), curing agent (C) and curing catalyst (D) shown in Table 4 were used in amounts shown in Table 4.

This coating composition was applied on a polycarbonate plate (7×15×0.3 cm), which had been previously subjected to under-coating (ELUVACITE 2041), by spray coating in a coating amount of 200 g/m² and dried at room temperature (about 25° C.) for one week to obtain a coated plate.

With respect to the obtained coated plate, tests were carried out in the same manner as in Example 1 and further pencil hardness was measured. The results are shown in Table 4.

EXAMPLE 24

A coating composition was prepared in the same manner as in Example 16 except that the resin (A), stain-proofing component (B), curing agent (C) and curing catalyst (D) shown in Table 4 were used in amounts shown in Table 4. A coated plate for tests was produced in the same manner as in Example 23.

With respect to the obtained coated plate, tests were carried out in the same manner as in Example 1 and further pencil hardness was measured. The results are shown in Table 4.

TABLE 4

|  | Example | | | | | |
| --- | --- | --- | --- | --- | --- | --- |
|  | 19 | 20 | 21 | 22 | 23 | 24 |
| Synthetic resin (A) | | | | | | |
| Synthetic resin 1 | 100 | | | | 100 | |
| Synthetic resin 2 | | 100 | 100 | 100 | | 100 |
| Stain-proofing component (B) | | | | | | |
| Stain-proofing component 1 | 1 | 1.0 | 0.2 | 0.2 | 1 | 1 |
| Curing agent (C) | | | | | | |
| Curing agent 1 | 12 | 20 | | | | |
| Curing agent 7 | | | 10 | 10 | 10 | 10 |
| Curing agent 8 | | | | 1 | | 1 |
| Curing catalyst (D) | | | | | | |
| 1% DBTDL | 2 | 2 | 2 | 2 | 2 | 2 |
| Substrate | Soft PVC | Soft PVC | Soft PVC | Soft PVC | PC | PC |

|  | Example | | | | | |
| --- | --- | --- | --- | --- | --- | --- |
|  | 19 | 20 | 21 | 22 | 23 | 24 |
| Stain removing test using oily ink | A | A | A | A | A | A |
| After wiping with acetone | A | A | A | A | A | A |
| Lacquer spray | A | A | A | A | A | A |
| Hairdye | A | A | A | A | A | A |
| Curry soup | A | A | A | A | A | A |
| Weather resistance after 500-hour test | A | A | A | A | A | A |
| Adhesion | | | | | | |
| Initial adhesion | 100/100 | 100/100 | 100/100 | 100/100 | 100/100 | 100/100 |
| Adhesion after water resistance test | 100/100 | 100/100 | 100/100 | 100/100 | 100/100 | 100/100 |
| Pencil hardness | B | HB | HB | F | F | H |

EXAMPLE 25 TO 26

Coating compositions were prepared in the same manner as in Example 16 except that the resin (A), stain-proofing component (B), curing agent (C) and curing catalyst (D) shown in Table 5 were used in amounts shown in Table 5.

The coating compositions were applied on a polyester plate (7×15×0.3 cm), which had been previously subjected to under-coating (URETHANE 5138, urethane resin available from Nippon Polyurethane Kabushiki Kaisha), by spray coating in a coating amount of 200 g/m² and dried at room temperature (about 25° C.) for one week to obtain coated plates.

With respect to the obtained coated plates, tests were carried out in the same manner as in Example 1 and further pencil hardness was measured. The results are shown in Table 5.

TABLE 5

|  | Example | |
| --- | --- | --- |
|  | 25 | 26 |
| Synthetic resin (A) | | |
| Synthetic resin 2 | 100 | 100 |
| Stain-proofing component (B) | | |
| Stain-proofing component 1 | 0.2 | 0.2 |
| Curing agent (C) | | |
| Curing agent 7 | 10 | 10 |
| Curing agent 8 | | 1 |
| Curing catalyst (D) | | |
| 1% DBTDL | 2 | 2 |
| Substrate | PET | PET |
| Stain removing test using oily ink | A | A |
| After wiping with acetone | A | A |
| Lacquer spray | A | A |
| Hairdye | A | A |
| Curry soup | A | A |
| Weather resistance after 500-hour test | A | A |
| Adhesion | | |
| Initial adhesion | 100/100 | 100/100 |
| Adhesion after water resistance test | 100/100 | 100/100 |
| Pencil hardness | HB | F |

INDUSTRIAL APPLICABILITY

The coating composition of the present invention is excellent in a stain-proofing property, particularly removability of oily stain, and therefore scribblings can be easily wiped off and also the coating composition is excellent in weather resistance and adhesion and therefore is suitable for various kinds of outdoor coatings.

The invention claimed is:

1. A coating composition comprising, in admixture, (A) a fluorine-containing resin having hydroxyl group or carboxyl group, (B) a stain-proofing component having amino group and (C) an isocyanate compound as a curing agent, in which:
   the fluorine-containing resin has a fluorine content of not less than 20% by mass,
   the stain-proofing component (B) is (B1) a liquid functional group-containing polydialkylsiloxane having amino group at its side chain and represented by the formula (1):

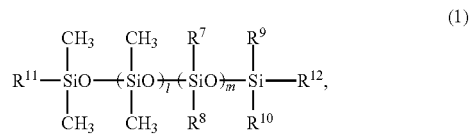

wherein at least one of $R^7$ and $R^8$ is —$R^{13}$—$Y^1$, in which $R^{13}$ is a divalent hydrocarbon group which has from 0 to 14 carbon atoms and may have nitrogen atom and $Y^1$ is —$R^{14}NH_2$ or —$R^{14}NHR^{15}NH_2$, in which $R^{14}$ is an alkylene group having 0 to 8 carbon atoms; $R^7$ and $R^8$ other than —$R^{13}$—$Y^1$, $R^9$, $R^{10}$, $R^{11}$ and $R^{12}$ are the same or different and each is an alkyl group having 1 to 8 carbon atoms; l is an integer of from 1 to 10,000; m is an integer of from 1 to 1,000,
a hydroxyl value of the fluorine-containing resin (A) having hydroxyl group is from 10 to 300 mgKOH/g, and
an amino equivalence of the stain-proofing component (B) is not less than 1,000.

2. The coating composition of claim 1, wherein the curing agent (C) is an isocyanate compound having hydrolyzable alkyl silicate residue.

3. The coating composition of claim 1, which further contains a curing catalyst (D).

4. The coating composition of claim 1, wherein the stain-proofing component (B) is blended in an amount of not less than 0.01 part by weight and not more than 50 parts by weight to 100 parts by weight of the resin (A).

5. The coating composition of claim 1, wherein the coating composition is formed into an organic solvent type coating composition containing an organic solvent.

6. The coating composition of claim 1, wherein the coating composition is dispersed in an aqueous medium to prepare an aqueous dispersion type coating composition.

* * * * *